United States Patent [19]

Taniuchi et al.

[11] Patent Number: 5,363,212

[45] Date of Patent: Nov. 8, 1994

[54] MARKER DOT DETECTING DEVICE FOR COLOR IMAGE RECORDING APPARATUS

[75] Inventors: Kazuman Taniuchi; Hiroshi Sekine; Noboru Akita; Isao Kuwahara; Kiyomasa Endoh, all of Kanagawa, Japan

[73] Assignee: Fuji Xerox Co., Ltd., Tokyo, Japan

[21] Appl. No.: 882,283

[22] Filed: May 13, 1992

[30] Foreign Application Priority Data

May 14, 1991 [JP] Japan .................. 3-109245

[51] Int. Cl.$^5$ ............ H04N 1/387; H04N 1/40; H04N 1/46
[52] U.S. Cl. .................. 358/452; 358/453; 358/537; 358/538; 382/30; 382/34
[58] Field of Search ............. 358/537, 538, 452, 453, 358/462; 382/30, 34

[56] References Cited

U.S. PATENT DOCUMENTS

| | | | |
|---|---|---|---|
| 4,538,182 | 8/1985 | Saito | 358/537 |
| 5,016,096 | 5/1991 | Matsunawa et al. | 358/537 |
| 5,140,440 | 8/1992 | Sasaki | 358/452 |
| 5,241,609 | 8/1993 | Hasebe et al. | 358/537 |

*Primary Examiner*—Scott A. Rogers
*Attorney, Agent, or Firm*—Finnegan, Henderson, Farabow, Garrett & Dunner

[57] ABSTRACT

A marker dot detecting device for a color image recording apparatus such as a color copying machine, color facsimile, or color printer. The marker dot detecting device includes a marker dot detecting unit for detecting a marker dot by detecting a plane size of binary image data having a preset marker color. Further, the marker dot detecting unit includes a template mask unit having a first template mask in a predetermined first size and a second template mask in a predetermined second size larger than the first size, the second template mask including the first template mask. The template mask unit outputs a marker dot detecting signal when a detected size of the marker dot is larger than that of the first template mask and smaller than that of the second template mask.

8 Claims, 20 Drawing Sheets

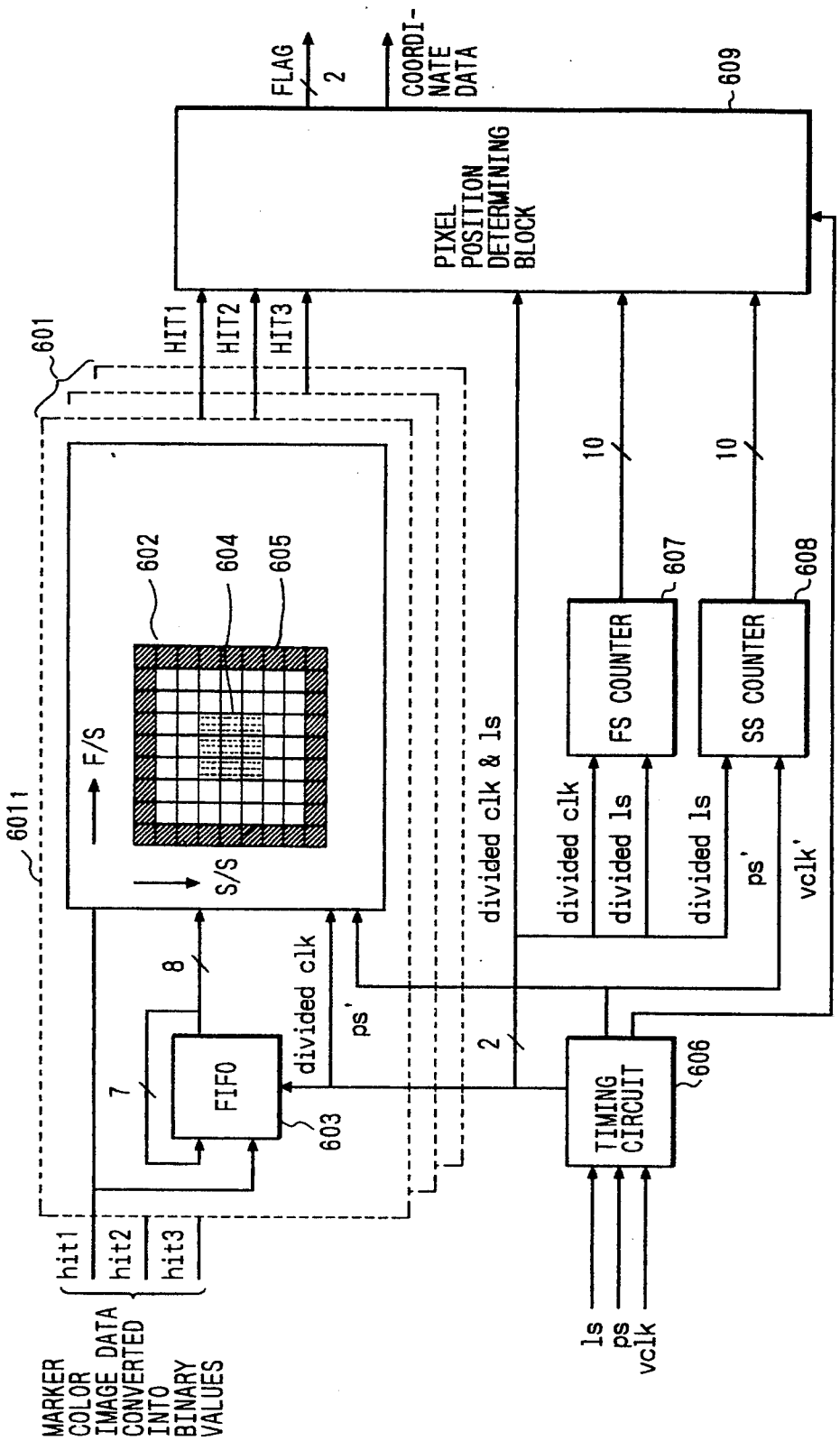

| MARKER COLOR | HIT | | | FLAG | |
|---|---|---|---|---|---|
| | 13 | 12 | 11 | FLAG1 | FLAG0 |
| NONE | 0 | 0 | 0 | 0 | 0 |
| 1 | 0 | 0 | 1 | 0 | 1 |
| 2 | 0 | 1 | 0 | 1 | 0 |
| 3 | 1 | 0 | 0 | 1 | 1 |

| ESS | | MON | FUL | TYPE | | NEG | CCSEL | | | MUL | | | | TSEL | LOGIC | | |
|---|---|---|---|---|---|---|---|---|---|---|---|---|---|---|---|---|---|
| 1 | 0 | | | 1 | 0 | | 2 | 1 | 0 | 3 | 2 | 1 | 0 | | 2 | 1 | 0 |

18bit

MSB ← → LSB

FIG. 13

| INPUT | | | OUTPUT | | | |
|---|---|---|---|---|---|---|
| LOGIC | flag | V>CP | psel | zt | sp | |
| 0 0 0 | — | — | 0 | 1 | 0 | THROUGH |
| 0 0 1 | 0 | — | 0 | 0 | 0 | CHARACTER COLORATION |
| 0 0 1 | 1 | — | 1 | 1 | 0 | |
| 0 1 0 | 0 | — | 1 | 1 | 0 | COLOR RELIEF CHARACTER |
| 0 1 0 | 1 | — | 1 | 1 | 1 | |
| 0 1 1 | — | 0 | 1 | 1 | 0 | NOT USED |
| 0 1 1 | — | 1 | 0 | 1 | 0 | |
| 1 0 0 | — | — | 1 | 1 | 0 | PAINT |
| 1 0 1 | 0 | — | 0 | 1 | 0 | CHARACTER SYNTHESIS |
| 1 0 1 | 1 | — | 1 | 1 | 0 | |
| 1 1 0 | 0 | — | 1 | 1 | 0 | COLORATION |
| 1 1 0 | 1 | — | 0 | 1 | 0 | |
| 1 1 1 | 0 | 0 | 0 | 1 | 0 | NOT USED |
| 1 1 1 | 0 | 1 | 0 | 1 | 0 | |
| 1 1 1 | 1 | 0 | 0 | 1 | 0 | |
| 1 1 1 | 1 | 1 | 0 | 1 | 0 | |

FIG. 14

| LOGIC 2,1,0 | function | OUTPUT | | OPERATION |
|---|---|---|---|---|
| | | f.g. | b.g. | |
| 0,0,0 | THROUGH | video | | |
| 0,0,1 | CHARACTER COLORATION | color_palt | 0 (BLANKING) | |
| 0,1,0 | COLOR RELIEF CHARACTER | fore_palt | color_palt | |
| 1,0,0 | PAINT | color_palt | | |
| 1,0,1 | CHARACTER SYNTHESIS | color_palt | video | |
| 1,1,0 | COLORATION | video | color_palt | |

FIG. 15

| TSEL | MEANING | OPERATION |
|---|---|---|
| 0 | ANNOTATION | DETERMINED AS f.g. IF V>TH |
| 1 | CHARACTER SYNTHESIS | DETERMINED AS f.g. IF TEX (CHARACTER MEMORY READ VALUE)=1 |

FIG. 16

| MUL | | | | COEFFICIENT FOR MULTIPLIER |
|---|---|---|---|---|
| 3 | 2 | 1 | 0 | |
| 0 | 0 | 0 | 0 | THROUGH |
| 0 | 0 | 0 | 1 | A |
| 0 | 0 | 1 | 0 | B |
| 0 | 0 | 1 | 1 | C |
| 0 | 1 | 0 | 0 | D |
| 0 | 1 | 0 | 1 | E |
| 0 | 1 | 1 | 0 | F |
| 0 | 1 | 1 | 1 | G |
| 1 | 0 | 0 | 0 | H |
| 1 | 0 | 0 | 1 | I |
| 1 | 0 | 1 | 0 | J |
| 1 | 0 | 1 | 1 | K |
| 1 | 1 | 0 | 0 | L |
| 1 | 1 | 0 | 1 | M |
| 1 | 1 | 1 | 0 | N |
| 1 | 1 | 1 | 1 | O |

FIG. 17

| CCSEL | | | OPERATION OF COLOR CONVERTING CIRCUIT | | | |
|---|---|---|---|---|---|---|
| 2 | 1 | 0 | D | C | B | A |
| 0 | 0 | 0 | | | | |
| 0 | 0 | 1 | | | | O |
| 0 | 1 | 0 | | | O | |
| 0 | 1 | 1 | | O | | |
| 1 | 0 | 0 | O | | | |
| 1 | 0 | 1 | | | O | O |
| 1 | 1 | 0 | | O | O | O |
| 1 | 1 | 1 | O | O | O | O |

FIG. 18

| NEG | MEANING |
|---|---|
| 0 | ORDINARY COPYING |
| 1 | COPYING IN NEGATIVE/ POSITIVE REVERSAL |

FIG. 19A
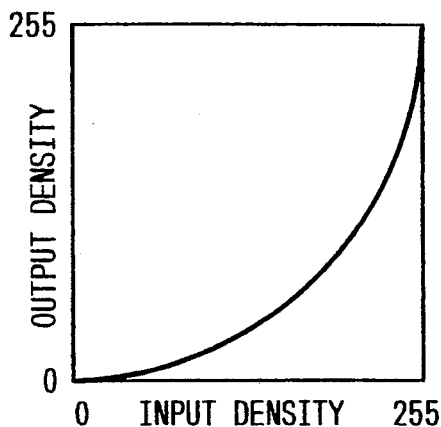
FIG. 19B
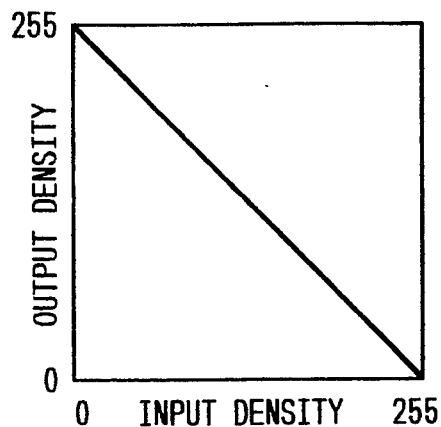
FIG. 20
| TYPE | | TYPE OF ORIGINAL SHEET |
|---|---|---|
| 1 | 0 | |
| 0 | 0 | STANDARD |
| 0 | 1 | CHARACTER |
| 1 | 0 | PHOTOGRAPH |
| 1 | 1 | MAP |
FIG. 21
| FUL | MON | MODE OF ORIGINAL SHEET |
|---|---|---|
| 0 | 0 | THREE COLORS |
| 0 | 1 | MONO-COLOR, B/W |
| 1 | 0 | FOUR COLORS |
| 1 | 1 | FOUR COLORS |

| ESS | | MEANING |
|---|---|---|
| 1 | 0 | |
| 0 | 0 | SCANNER |
| 0 | 1 | EXTERNAL INPUT |
| 1 | 0 | TEXTURE SYNTHESIS |
| 1 | 1 | WATERMARK SYNTHESIS |

MARKER DOT DETECTING DEVICE FOR COLOR IMAGE RECORDING APPARATUS

BACKGROUND OF THE INVENTION

The present invention relates to a color image recording apparatus, such as a color copying machine, color facsimile, or color printer, and more particularly to a color image recording apparatus having the function of being capable of specifying an editing area by drawing a marker dot at an arbitrarily selected position in a closed area within an image.

A digital color copying machine includes an image reading means for reading an original sheet by scanning it, an image editing means for processing and editing the image data thus read, an image output means for recording the image data processed and edited, and a control means for controlling the image reading means, the image editing means, and the image output means and are capable of executing various editing processes on the image data with the image editing means. Further, the digital color copying machine has come to employ highly advanced digital color image processing techniques in the recent years, so that such a machine has realized a large number of color image editing functions.

Incidentally, an image on a black-and-white original sheet may contain a closed area such as a table or a circular graph drawn therein, and it is desired from time to time to execute such an editing process as extraction (trimming) or deletion (masking) on the inside of such a closed area. Also, it is desired in some cases to form an arbitrarily determined closed area in an image on an original sheet, using an editing pad comprised of a digitizer or drawing the closed area in the image on the original sheet by a marking pen having a predetermined color, and to give various editing processes to the image inside the closed area.

For these purposes, a method has been proposed in which a bit map plane memory (which will be hereafter referred to simply as "plane memory") is used for searching for a closed area set up by the user. A summary description of the method is given as follows.

FIG. 26 is a schematic diagram showing a construction to be used in search for a closed area. Now, it is assumed that a closed area is drawn in an original sheet in black and white and that one point in the closed area is specified by means of an editing pad. The data on the coordinates for the point specified in this manner are notified to and taken into a graphic controller 101. First, a prescanning operation is performed on the original sheet, the image data thus read being converted into binary values, further subjected to a conversion of the pixel density as appropriate, and then written to a plane memory 103 by way of a direct memory access controller (DMAC) 102 under control performed by the graphic controller 101, and the image on the original sheet as converted into binary values representing black and white is thereby written to the plane memory 103. The conversion of the pixel density is done in order to limit the capacity of the plane memory 103 to a necessary minimum. In this case, the image on the original sheet is read at 400 spi and the data thus read are subjected to a density conversion into data at 100 spi and fed into the DMAC 102. As the construction for use in performing such a conversion of pixel density is generally known in the art, it is omitted from the description given here. Moreover, various ways are conceivable for the method of determining whether the pixel should be made black or white after a density conversion, but one pixel after such a density conversion is to be made black in case even one black pixel is included in the read 4×4 pixels.

Now it is assumed here that 15 closed areas in the maximum can be set up in one original sheet and that mutually different editing processes can be done at the same time on the individual closed areas thus set up. Then, as data in four bits are necessary for distinguishing the 15 closed areas, the plane memory 103 is in need of four sheets of bit map plane memories, and it can be understood here that one bit can thereby be given to each plane memory, so that it is possible to construct data in four bits as a whole. Moreover, it is to be noted in this regard that these four-bit data will be referred to as "area command (ACMD)" hereinafter. In addition, the plane memory 103 also needs a plane for conducting a search for a closed area.

An example of the construction of the plane memory 103 is shown in FIG. 27. The plane memory 103 is comprised of a random access memory (RAM) having word addresses from $O_H$ to $BEB8F_H$ (wherein H indicates a hexadecimal number, and this applies in the same manner to the notations used in the subsequent part), and these areas are divided into a work plane $P_W$, a mask plane $P_M$, and four planes from $P_3$ to $P_0$ in which the area command is actually stored.

Now, it will be described, with reference to FIG. 28, how a search for a closed area is performed, and how an ACMD will be formed as the result of such a search, with the system in the construction described above. FIG. 28 is a conceptual chart illustrating the process for the formation of an ACMD in a work plane $P_W$ and a mask plane $P_M$, and it is assumed here that the value of the pixel is "1" in the areas indicated with the slant lines and also that the value of the pixel is "0" in the other areas. First, the image data are written in regular sequence to the work plane $P_W$ as illustrated in FIG. 28A. At this moment, the mask plane $P_M$ is in a cleared state as shown in FIG. 28F. When the writing of the data to the work plane $P_W$ is completed, the graphic controller 101 paints out the pixels on the mask plane $P_M$ with "1" (FIG. 28G) with respect to those pixels present within a sphere in which the value of the pixel is "1," namely, a closed area which is defined with a contour line, in such a manner that the painting operation will center around the points Q and R (See FIG. 28B) which the user has specified, on the basis of the data on the point coordinates which a Central Processing Unit (CPU) (not shown in FIG. 26) has notified to the graphic controller 101. By the effect of this, no such painting out will be done on the mask plane $P_M$ in any closed area in which such inside points are not specified, as indicated by reference numeral 112 in FIG. 28A, and any such closed area will be ignored even if there is any other area drawn in the image of the original sheet.

Next, the graphic controller 101 copies the pattern written in the mask plane $P_M$ to the work plane $P_W$ as shown in FIG. 28C. At this moment, the mask plane $P_M$ is in the state as illustrated in FIG. 28H and is thus put in the same state as that shown in FIG. 28G. When the copying of the pattern from the mask plane $P_M$ to the work plane $P_W$ is completed, the graphic controller 101 erases the pattern present on the mask plane $P_M$ (See FIG. 28I) and copies the pattern data to the area on the mask plane $P_M$ (See FIG. 28J), painting with the address of the corner S (See FIG. 28E) on the work plane $P_W$ specified as the starting point. At this time, the values of the pixels will be reversed, so that the pixels in the value "1" will have the value replaced with "0" while the pixels in the value "0" will have the value replaced with "1".

With the operations described above, it is possible to extract the contour line for a specified closed area, and, after this operation, the graphic controller 101 develops the pattern present on the mask plane $P_M$ from the specified points Q and R to the planes $P_3$ to $P_0$, at which the graphic controller 101 allocates an ACMD consisting of four bits to each closed area. Now, let us assume that the CPU assigns $F_H$ to the closed area containing the specified point Q therein and $E_H$ to the closed area containing the specified point R therein. The graphic controller 101 writes values to the planes $P_3$ to $P_0$, taking the plane $P_3$ as the most significant bit and the plane $P_0$ as the least significant bit, and an ACMD as shown in FIG. 29 is thereby generated. In this regard, the area commands for the individual closed areas are designed in such a manner that the specified points will be allocated, for example, from $F_H$ to $O_H$ in the registered sequence or in the sequence reverse to the registered one.

The ACMD, which has been generated in this manner, will be read out of the plane memory 103 in synchronization with an operation for reading an image on the original sheet at the time of a copy scanning operation, which is performed for making an actual copy, being then subjected to a conversion of its pixel density from 100 spi into 400 spi, and being thereafter fed to the editorial work processing block. This series of operations will execute an editing process as set in respect of each closed area.

The description given above relates to a case in which the graphic controller 101 extracts a closed area drawn in an image on the original sheet, thereby searching for a closed area to be edited. The graphic controller 101 will perform the same operations in search for a closed area also with respect to a closed area drawn with a marking pen and a closed area indicated on an editing pad.

However, the conventional method requires that the points specified for a search for a closed area should be entered by operations on an editing pad, and, in case the operator has to execute an editing process on many closed areas, this requirement presents the problem that the operator tends to forget to which of the closed areas he has specified the points.

SUMMARY OF THE INVENTION

For the present invention, it is an object to offer a marker dot detecting device for a color image recording apparatus which can overcome the disadvantage mentioned above, namely, which is capable of indicating the points for a search for a closed area by drawing dots with a marker in a predetermined color, in addition to being capable of indicating the points by operations on an editing pad in the same manner as in the conventional device, for specifying a closed area where an editing process is to be executed.

Another object of the present invention is to offer a marker dot detecting device for a color image recording apparatus which can detect the positions of marker dots in an unfailing way.

In order to attain the above objects, the present invention provides a marker dot detecting device for a color image recording apparatus, including marker dot detecting means for detecting a marker dot by detecting a plane size of binary image data having a preset marker color.

BRIEF DESCRIPTION OF THE DRAWINGS

The manner by which the above objects and other objects, features and advantages of the present invention are attained will be fully evident from the following detailed description when it is considered in light of the drawings, wherein:

FIG. 6 is a diagram showing an example of the construction of a coordinate value generator;

FIG. 13 is a table for explaining an example of the construction of a logic table;

FIG. 14 is a chart for explaining the logic data;

FIG. 15 is a table for explaining the TSEL data;

FIG. 16 is a table for explaining the MUL data;

FIG. 17 is a table for explaining the CCSEL data;

FIG. 18 is a table for explaining the NEG data;

FIGS. 19A and 19B are graphs for explaining the negative/positive reversing process;

FIG. 20 is a table for explaining the TYPE data;

FIG. 21 is a table for explaining the FUL data and the MON data;

DETAILED DESCRIPTION OF THE PREFERRED EMBODIMENT

The present invention offers a marker dot detecting means which detects marker dots by detecting a plane size of image data as converted into binary values with a predetermined marker color. There are two constructions described below for the marker dot detecting means.

Figure 1A:
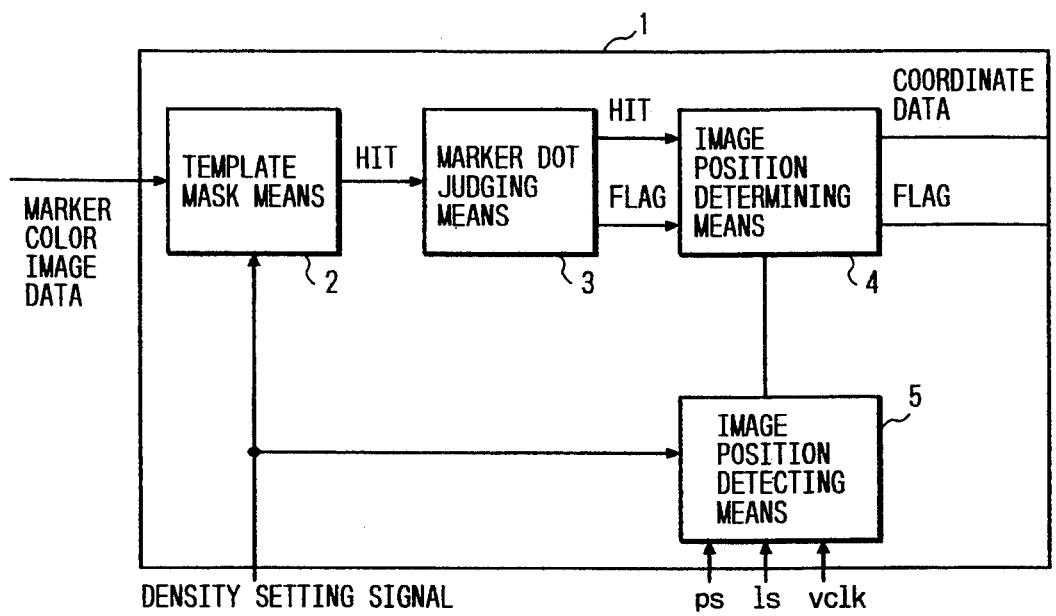
FIGS. 1A through 1C are diagrams illustrating examples of the construction of a marker dot detecting device according to the present invention.

Now, a first construction of the marker dot detecting means will be described with reference to FIG. 1A. In FIG. 1A, the marker dot detecting means 1 includes a template mask means 2, a marker dot judging means 3, a pixel position determining means 4, and a pixel position detecting means 5.

Figure 1B:
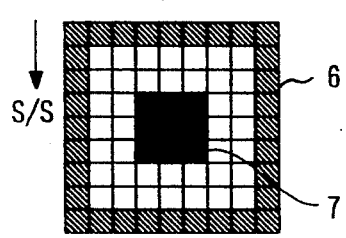

The template mask means 2 is provided with a first template mask 7 in a predetermined first size and a second template mask 6 containing the first template mask 7 therein and being larger than the first size, as shown in FIG. 1B. In the template mask means 2, the marker color image data fed in binary values are divided into blocks having a predetermined size, and the size of the block is compared with that of the first template mask 7 and that of the second template mask 6. In case the template mask means 2 is as illustrated in FIG. 1B, the marker color image data fed into the template mask means 2 are divided into 9×9 blocks, and the template mask means 2 will output a HIT signal, which is a marker dot detecting signal, only in a case in which the marker dot size is entirely overlapped with the first template mask 7 and not overlapped with the second template mask 6 at all.

In this regard, it is desirable not to limit the marker color to any single color, but to prepare a plural number of marker colors. The reason is that it is conceivable that the use of a single marker color may result in a confusion as to the point what editing process has been set for a given closed area in case different editing processes are to be executed on many areas. To the contrary, in case a plural number of marker colors are made available, the user will be enabled, for example, to use different marker colors freely for different types of editing processes, whereby making it possible for the user not only to specify a closed area with ease, but also clearly to distinguish what editing processes have been set up for the individual closed areas. This feature can be realized by providing template mask means 2 for each of the marker colors.

Incidentally, there are cases in which HIT signals are generated in succession from the template mask means 2 in consequence of the relationship between the size of the marker dot and the respective sizes of the first template mask 7 and the second template mask 6. If coordinates for the marker dots were generated on the basis of all such HIT signals, it would be necessary to provide some memory capacity for storing the coordinate data, and the marker dot judging means 3 is therefore employed for monitoring the status of the output of the HIT signals. In case HIT signals are output in succession, the marker dot judging means 3 issues a HIT signal, judging only the initial HIT signal to be effective, while it does not issue any additional HIT signal, disregarding all the other HIT signals. Moreover, in case the marker dot detecting means 1 is provided with a plural number of template mask means as mentioned above, the marker dot judging means 3 does not issue any HIT signal when HIT signals are generated at the same time from two or more template mask means since the marker dot judging means 3 is designed in such a manner that it determines all the HIT signals to be void of effect in any such situation. The generation of HIT signals from two or more template mask means 2 means that two or more marker dots are drawn in the same position, and, as a state like this is an unnatural one, the marker dot judging means 3 is designed to prohibit any such HIT signal from being issued.

Further, in case the marker dot detecting means 1 is provided with any plural number of template mask means, the marker dot judging means 3 issues the effective HIT signals and also outputs a marker color flag FLAG, which indicates in what color the means has detected the marker dots. The processing operations described above can be performed by logical circuits constructed as appropriate.

The pixel position detecting means 5 takes into itself a page synchronizing signal ps, which indicates the beginning of image data, a line synchronizing signal ls, which indicates the position of a pixel in the subsidiary scanning direction, and a video clock vclk, which indicates the position of the pixel in the main scanning direction, and then detects the position of the pixel located in the center of the pixels fed into the template mask means 2 occupying in the image on the original sheet.

The pixel position determining means 4 determines that the position of the pixel which has been detected by the pixel position detecting means 5 is the coordinates for the marker dot, when it has been notified of any HIT signal from the marker dot judging means 3, and then outputs the coordinate data for the coordinates thus determined, together with a marker color flag FLAG.

Figure 26:
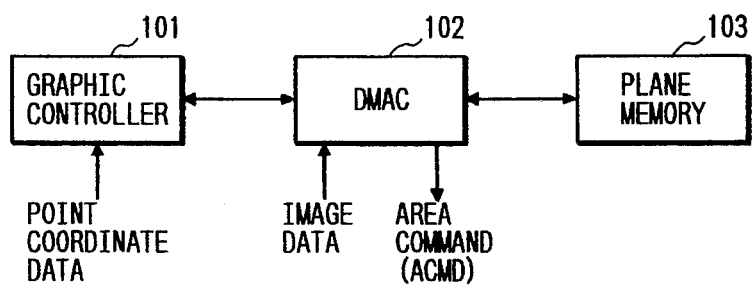
FIG. 26 is a diagram showing an example of the construction for generating an area command ACMD.
Figure 27:
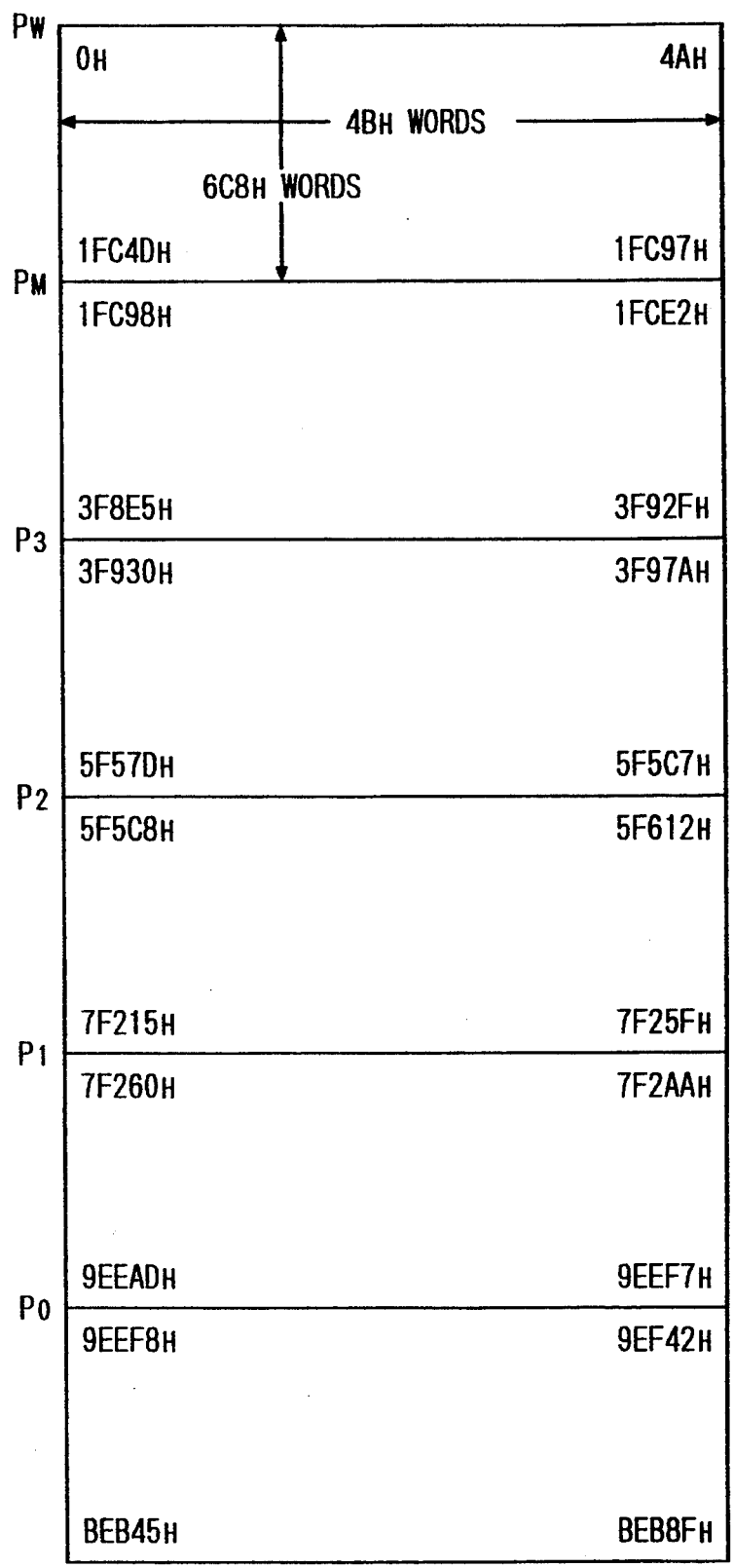
FIG. 27 is a chart showing an example of the construction of a plane memory.
Figure 28A:
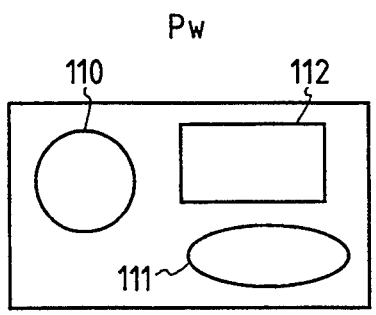
FIG. 28 is a set of charts for explaining a closed area searching process.
Figure 28F:
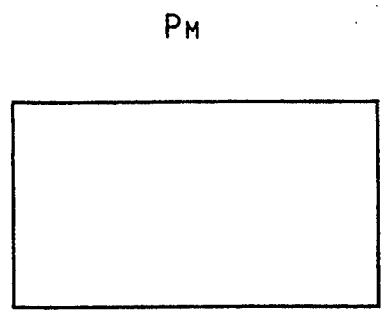
Figure 28B:
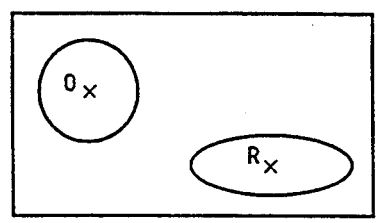
Figure 28G:
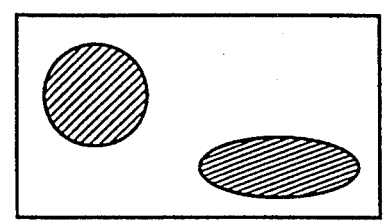
Figure 28C:
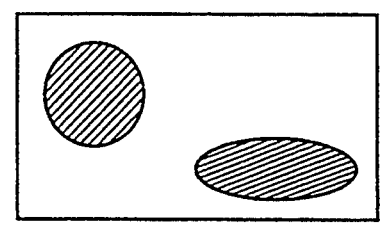
Figure 28H:
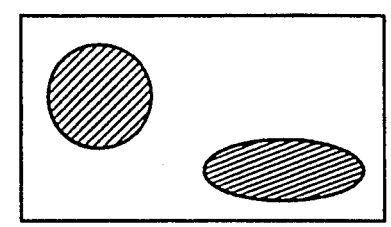
Figure 28D:
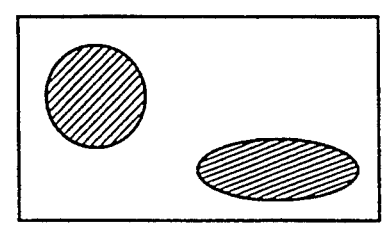
Figure 28I:
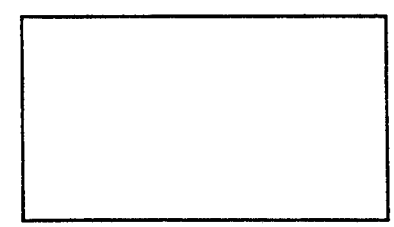
Figure 28E:
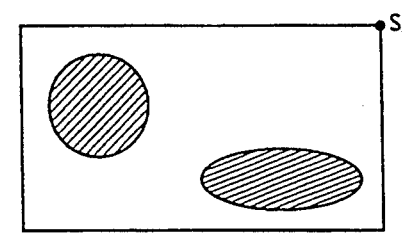
Figure 28J:
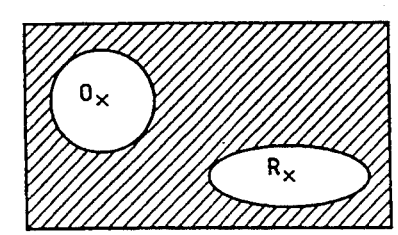
Figure 29:
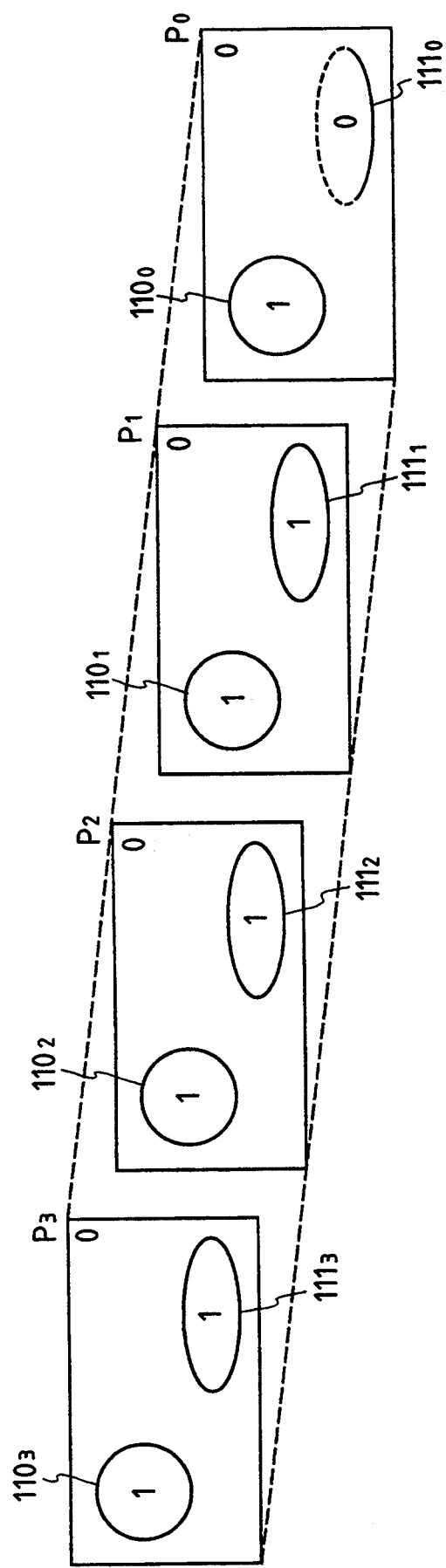
FIG. 29 is a set of charts for explaining an area command ACMD consisting of four bits.

The coordinate data and FLAG are written into a RAM (not shown in FIG. 1A) and used for a closed area searching process in the graphic controller 101, which is shogun in FIG. 26.

Now, the pen points for the marking pens are available in a variety of thickness, which will produce variations in the dot diameter of the marker dots. It is therefore necessary to make it possible to deal properly with various dot diameters by permitting a change in the density of the coordinates on the occasion when the marker color image data are divided into blocks. Accordingly, in the present invention, the template mask means 2 is capable of making changes in the density of the coordinates in response to a density setting signal. The density setting signal is notified also to the pixel position detecting means 5. The pixel position detecting means 5 will change the line synchronizing signal ls and the timing for the counting operation of the video clock vclk, depending on the density of the coordinates indicated by the density setting signal and will detect the same pixel position for one marker dot without any regard to the state of the density of the coordinates.

Figure 1C:
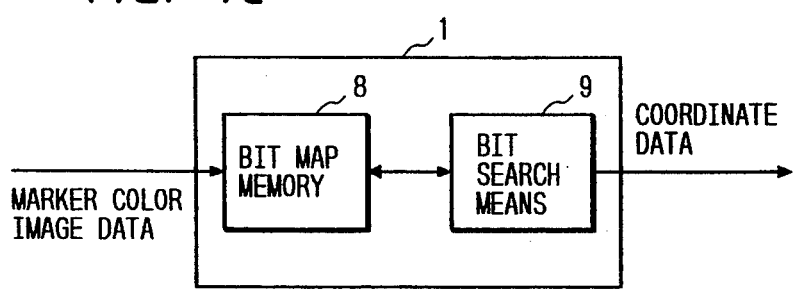

The first construction of the marker dot detecting means 1 has thus been described above, and next the second construction of the marker dot detecting means 1 will be described below with reference to FIG. 1C.

The marker color image data which, as converted into binary values, are fed into the marker dot detecting means 1 are written in regular sequence to a bit map memory 8, and a pattern is formed therein for the marker color image as converted into binary values. A bit search means 9 detects the size of the pattern by detecting a changing point in the pattern of the marker color image in binary values which have thus been written into the bit map memory 8 and outputs the position of the pattern as the coordinates for the marker dot, provided that the detected pattern size is within a predetermined range.

Although these bit map memory 8 and bit search means 9 can be arranged as independent units, the existing plane memory 103 can be used concurrently as the bit map memory 8 and the graphic controller 101 can be used concurrently as the bit search means 9. In this case, the graphic controller 101 can therefore be set up in such a manner as to execute the above-mentioned operations, and an increase in the cost which results from the detection of the marker dots can thus be held down to the minimum.

Figure 2:
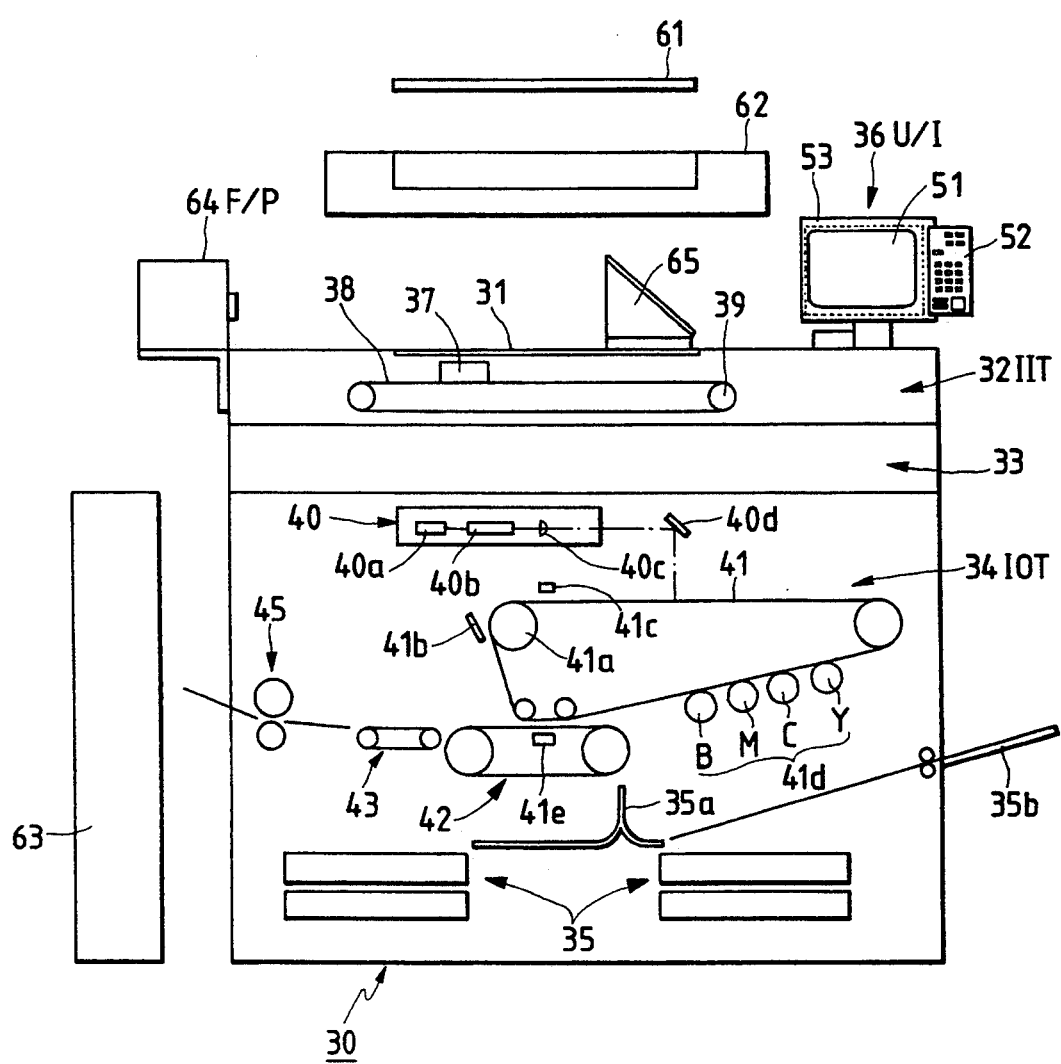
FIG. 2 is a schematic diagram illustrating the construction of a color copying machine to which the present invention has been applied.

FIG. 2 presents a schematic diagram illustrating the construction of a color copying machine to which the present invention has been applied. In FIG. 2, a base machine 30 is comprised of a platen glass 31, on which an original sheet is to be placed, an image input terminal (IIT) 32, an electrical system control unit housing block 33, an image output terminal (IOT) 34, a paper tray 35, and a user interface (U/I) 36, and is optionally comprised of an editing pad 61, an automatic document feeder (ADF) 62, a sorter 63, and a film image reading unit consisting of a film projector (F/P) 64 and a mirror unit (M/U) 65.

The IIT unit 32, which is comprised of an imaging unit (I/U) 37, a wire 38 for driving the imaging unit 37, a driving pulley 39, and so forth, reads the image information on a color original sheet by means of a CCD line sensor, subjecting the image information to a color decomposition into the three primary colors of light, blue (B), green (G), and red (R) by means of color filters set inside the I/U 37, converts the image information thus read into digital image data B, G, and R in multiple chromatic gradation, and outputs the converted digital image data to an image processing system (IPS).

The IPS, which is accommodated in the electrical system control unit housing block 33, performs various processing operations, such as various types of conversions, correcting processes, and editing processes, in order to enhance the colors, chromatic gradations, fineness, and other picture qualities, as well as features of reproduction, of image data in B, G, and R which it receives as input, then converts the image data into the primary colors of the toner, namely, yellow (Y), magenta (M), cyan (C), and black (K), further converts the toner signals representing the chromatic gradation of the process colors into toner signals expressing the binary values for ON and OFF respectively, and outputs the converted signals to the IOT 34.

The IOT 34, which is provided with a scanner 40, and a photoreceptor belt 41, converts the image data into an optical signal in a laser output block 40a, forms a latent image corresponding to the image of the original sheet on the photoreceptor belt 41 by way of a polygon mirror 40b, an F/θ lens 40c, and a reflecting mirror 40d, transfers the image onto the paper as transported from the paper tray 35, and discharges a color copy from the machine. In the IOT 34, the photoreceptor belt 41 is driven with a driving pulley 41a, and a cleaner 41b, a charging unit 41c, developing units 41d for the individual toner colors, Y, M, C, and K, and a transfer unit 41e are arranged in the area around the photoreceptor belt 41, and a transfer device 42 is installed in such a manner as to confront the transfer unit 41e. Then, the IOT 34 takes up a sheet of paper as it is transported from the paper tray 35 via the paper transport channel 35a, transfers the respective latent images for Y, M, C, and K onto the paper, rotating the transfer device 42 four turns in the case of a full color copying operation in four colors, transports the paper from the transfer device 42 via a vacuum transport unit 43 to a fusing unit 45, where the transferred images are fused on the paper, and thereafter discharges the paper. A single sheet inserter (SSI) 35b enables the operator selectively to feed a sheet of paper by manual operation into the paper transport channel 35a.

The U/I 36 enables the user to select a desired function and to give instructions on the conditions for the execution of the selected function, and this U/I 36, which includes a color CRT display 51 and a hard control panel 52, permits the user to give instructions directly by operations on the soft buttons on the screen when it is used in combination with an infrared ray touch board 53. Therefore, the user sets a menu for a mono-color editing job and the color for the mono-color process by means of the U/I 36 when he desires to perform a mono-color editing process. The area on which a mono-color editing job is to be performed is specified either by an input operation on the editing pad 61 or by drawing a closed loop with a marking pen having a predetermined color in a desired area on the original sheet.

The electrical system control housing block 33 accommodates a plural number of control boards constructed separately for the individual processing units, such as the IIT 32, the IOT 34, the U/I 36, the ISP, and the F/P 64, and additionally the circuit boards which are used to control the operations of such mechanisms as the IOT 34, the ADF 62, and the sorter 63, and the circuit board which controls the entire system of these boards.

Figure 3:
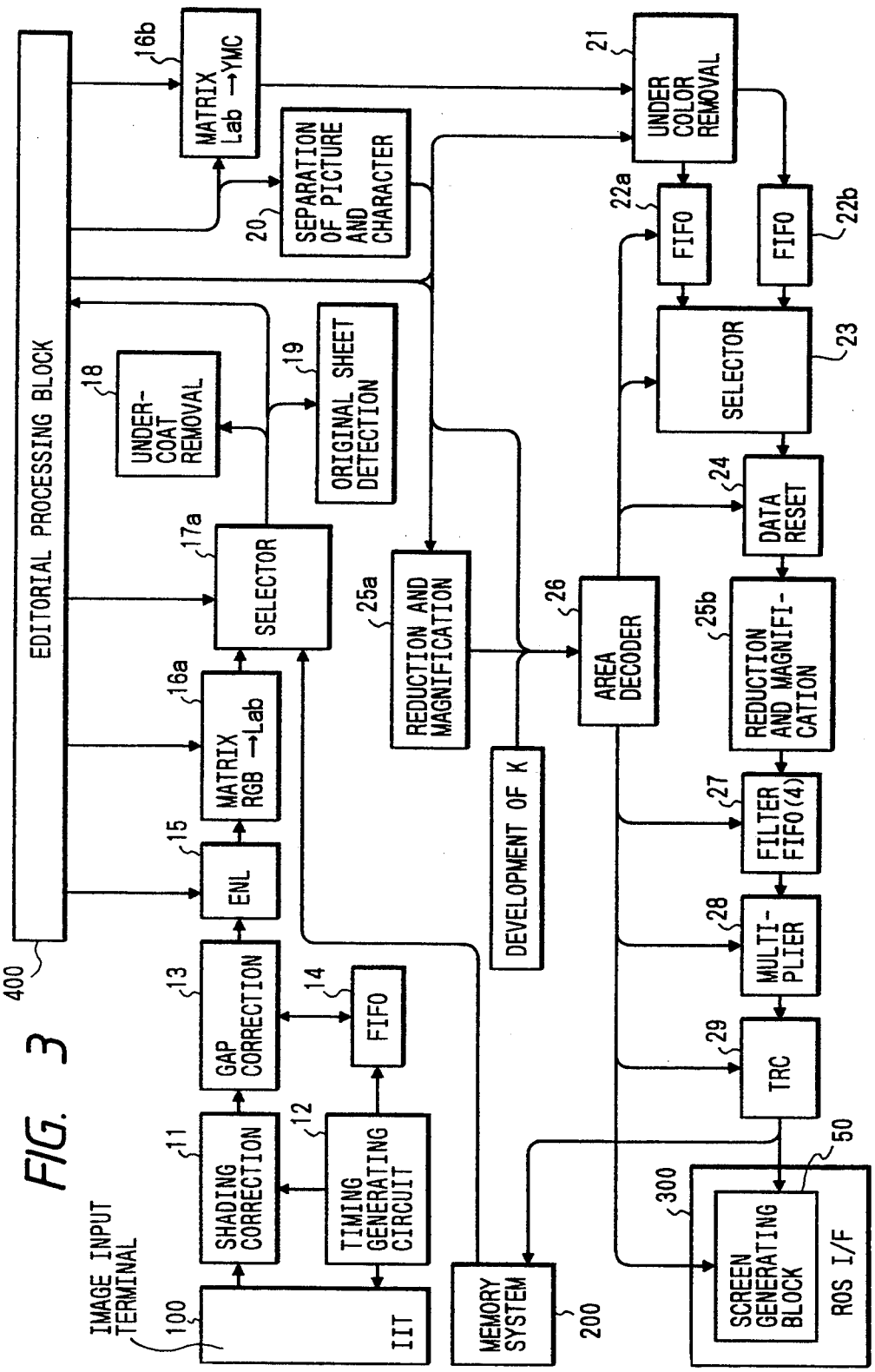
FIG. 3 is a block diagram showing an example of the construction of a signal processing system incorporated in the color copying machine shown in FIG. 2.

FIG. 3 presents a block diagram showing an example of the construction of a signal processing system incorporated in the color copying machine shown in FIG. 2. In FIG. 3, the image input terminal (IIT) 100 includes a reduced size type sensor comprised of three CCD line sensors for B, G, and R respectively, which are arranged, for example, at right angles with the subsidiary scanning direction and performs its reading of images, performing a scanning operation in the main scanning direction in synchronization with a timing signal generated from the timing signal generating circuit 12 while moving in the subsidiary scanning direction at such a speed as is in correspondence with the reducing or magnifying ratio. The image data for B, G, and R which have been read in this manner are formed into digital image data in a predetermined number of bits, for example, eight bits and then subjected to shading correction in a shading correction circuit 11 for compensating for the variances developed among the individual pixels under the influence of various factors, and are thereafter processed in a gap correction circuit 13 for a correction of gaps among the individual line sensors. This gap correction is for delaying the read image data by an amount corresponding to the gap by means of an FIFO 14, so that the image data in B, G, and R in the same position can be obtained at the same point of time.

An equivalent neutral lightness (ENL) unit 15 is intended for achieving a gray balance, and this ENL unit 15 includes a plural number of look-up tables (LUTs) in which the degrees of output density equivalent to the degrees of input density are written for each of the primary color signals for B, G, and R. It is determined by a NEGA signal or a TYPE signal notified from an editorial processing block 400 which LUT is to be used out of the plural number of LUTs.

The image data for B, G, and R as processed for a gray balance by the ENL unit 15 are converted by a matrix circuit 16a into a luminance signal L*, a first color difference signal a*, and a second color difference signal b* for a uniform chromatic space. Further, the coefficients for such a conversion of the image data for B, G, and R into L*, a*, and b* in the above-mentioned matrix circuit 16a are changed in accordance with a TYPE signal which is notified from the editorial processing block 400.

A selector 17, being controlled by an ESS signal notified from the editorial processing block 400, selectively takes out the output from the matrix circuit 16a or image data from a memory system 200, which is an external memory, or performs a process for synthesizing the output from the matrix circuit 16a with the image data from the memory system 200. Also, the selector 17 compares the density of each pixel in the input image data with a threshold value set in advance and notifies a TEX signal (in one bit) to the editorial processing block 400 in case the density of the pixel is in any excess of the threshold value.

An undercoat removing circuit 18 operates, for example, for detecting the density of the undercoat by making a histogram for the density of the original sheet in the prescanning operation and sets the density at zero for any pixel in any density below the density of the undercoat, thereby making improvements on the quality of the copy as compared with the original sheet. An original sheet detecting circuit 19 detects the size of the original sheet by finding its circumscribed rectangle through detection of the boundary between the back surface of a platen, which is in black, and the original sheet, and then stores the detected size of the original sheet in memory.

The image data fed from the selector 17 into the editorial processing block 400 and subjected to color editing are put into the matrix circuit 16b. The matrix circuit 16b lets L* pass through in case a control signal instructing a mono-color editing process is notified to it from the editorial processing block 400, but converts L*, a*, and b* into the toner colors, Y, M, and C and outputs the converted color data in any other case.

An under color removing circuit 21 performs the following operations on the basis of a control signal notified from the editorial processing block 400. Specifically, in case the editorial processing block 400 has given the under color removing circuit 21 a control signal which indicates that a character mode is set, the under color removing circuit 21 outputs L*, which is fed from the matrix 16b, to the First In First Out Memory (FIFO) 22b, but, in any other cases, forms a K-film or K-plate, as well as new Y, M, and C, from the Y, M, and C received from the matrix 16b and outputs the image data in the process color to the FIFO 22a. Further, in case a control signal instructing a mono-color editing process has been received from the editorial processing block 400, the under color removing circuit 21 outputs the luminance signal L*, which is fed into it from the matrix 16b, to the FIFO 22b.

The image data which have been processed for color editing by the editorial processing block 400 are fed into a picture/character separating circuit 20, which distinguishes characters in color, characters in black, and picture patterns on the basis of differences in their space frequency components.

The area decoder 26 decodes the control signal notified to it from the editorial processing block 400, the output signal fed into it from the picture/character separating circuit 20, and the output signal fed into it from the reducing and magnifying circuit 25a and distributes the decoded signals to the FIFO 22a, the selector 23, the data resetting circuit 24, the filter 27, the multiplier 28, the TRC 29, and the screen generating block 50.

The FIFO 22a is controlled for its operation or non-operation by a control signal from the area decoder 26 and is put into its operating state in case it is required to put out Y, M, C, and K, but is put into a non-operating state in any case other than that.

The selector 23 furnishes its output to either one of the FIFO 22a and the FIFO 22b as selected in accordance with a control signal notified to it from the area decoder 26. In case the image data L* for the area in which the mono-color editing process is set has been fed into the selector 23, the selector 23 selects the FIFO 22b by its operation based on a control signal generated from the area decoder 26.

The data resetting circuit 24 determines on the basis of a control signal fed into it from the area decoder 26 whether the image data fed into it in accordance with the process color are effective or ineffective. For example, in case a job for copying only the black characters on an original sheet has been selected, the image data should be furnished to the IOT 300 only at the time of a processing job for K. Therefore, it is only at the time of a processing job for K that the area decoder 26 generates a control signal to the effect that the image data are effective, and the data resetting circuit 24 thereby permits the character data, which are fed into it from the selector 23, to pass through as being effective, bit outputs data in zero density, treating the image data fed into it at the time of any processing job for any other color, Y, M, or C as being ineffective. Owing to these operations performed in this manner, it is possible to produce images of black characters free from turbidity.

The reducing and magnifying circuit 25a performs a reduction or a magnification of an editing command lest the areas in which the area control information for the image data are executed should deviate even in case a reduction or a magnification is made of the image data, and the reducing and magnifying circuit 25a furnishes area control information reduced or magnified as necessary, which are then decoded by the area decoder 24 and offered for use in the processing of image data in various parts. The reduction and magnification of editing commands in the reducing and magnifying circuit 25a mentioned above are performed by reducing or magnifying the area for the editing commands having the same value in the main scanning direction. Thus, the reducing and magnifying circuit 25a performs simple reduction and magnification and is therefore capable of making a reduction or a magnification for any editing command without performing any complicated control.

The reducing and magnifying circuit 25b reduces or magnifies image data in the main scanning direction by an interpolation between two points applied to image data, which are signals representing multiple values. In addition, the reducing and magnifying circuit 25b is arranged in the downstream of the color editing process, and the image data fed into the circuit are therefore only one of the image data in Y, M, C, or K corresponding to the process color. Accordingly, only one system of the above-mentioned reducing and magnifying circuit is sufficient, which ensures that the circuit can be constructed at a low cost.

The filter 27 is a space filter which is designed in such a way as to be capable of setting various filter characteristics by the setting of coefficients, and the coefficients are set in accordance with a control signal which is notified from the area decoder 26. For example, in case the character mode is set, a coefficient will be set, in accordance with a control signal, for making the high pass filter characteristics operative, and the edges of characters are thereby emphasized. However, in case the photographic mode or the like is set, a coefficient will then be set for making the low pass filter characteristics operative.

The multiplier 26 is provided with a table which contains the coefficients written to it for each of Y, M, C, and K for multiplications of the image data L* therewith in respect of through passage and mono-colors in fifteen colors determined in advance, as shown in FIG. 1B, and the multiplier 26 performs a multiplying operation on the image data for each process color, reading the table to obtain the coefficient for the mono-color indicated by the control signal from the area decoder 26. That is to say, the matrix 16b outputs a luminance signal L* as mentioned above in case a mono-color operation is set, and this luminance signal L* is fed into the multiplier 28 via the under color removing circuit 21, the FIFO 22b, the selectors 23 leading to the filter 27. Now, let us assume here that a job for putting out the green-mono-color is set up and further that a coefficient of 100% is written for both Y and C and a coefficient of 0% is written for both M and K for the green mono-color to the table mentioned above. Then, the multiplier 28 lets the L* fed into it at the time of its processing of Y and C pass through, while it sets the image data at zero at the time of its processing of M and K. The copying machine is thereby enabled to copy the luminance signal L* in green color free from turbidity. In this regard, the above-mentioned coefficients are written in the form of data for the coverage of Y, M, C, and K.

The TRC 29, which works for making adjustments of density in a manner suitable to the characteristics of the IOT 300, is comprised of LUTs to which the output density for the input density is written. Moreover, the LUT to be used is changed over for each process in accordance with a control signal fed from the area decoder 26. Also, the control over the changeover of the output, i.e. the control for determining whether the output should be directed to the memory system 200 or to the IOT 300, is performed with a control signal fed from the area decoder 26.

The screen generating block 50 generates images in mesh points from the image data having a density value.

Figure 4:
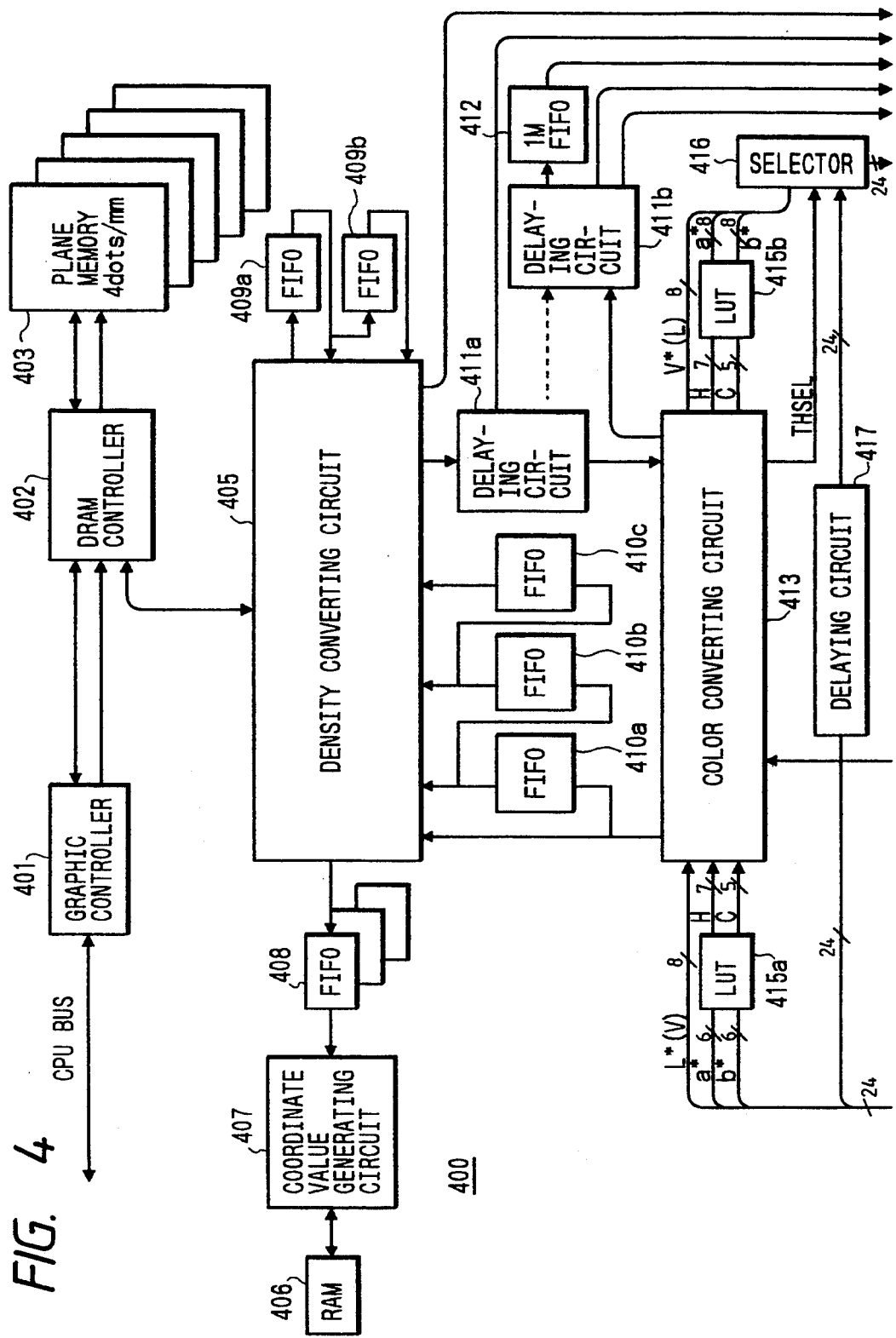
FIG. 4 is a block diagram showing an example of the construction of an editorial processing block.

The editorial processing block 400 performs such operations as color conversion and color editing, as well as the formation of an area, and an example of its construction is shown in FIG. 4.

The image data, L*, a*, and b*, each composed of eight bits adding up to a total of 24 bits, which are output from the selector 17a, are fed into a selector 416 with a delay by a delaying circuit 417 by the duration of the processing time for color editing in a color conversion and pallet circuit 413 (which will be referred to simply as a color converting circuit in the subsequent part). Also, the L* is applied as it is to the color converting circuit 413 for its use as a luminance signal V, but, with respect to the a* and the b*, only their six more significant bits are used as the input address for an LUT 415a, and a hue signal in seven bits and a chroma signal C in five bits are output. This operation is done in order to make it possible to perform such color editing operations as color conversion and coloring with ease.

The color converting circuit 413 performs various color editing operations as those described later on the image data L, H, and C on the basis of the editing commands fed into it from a density converting and area forming circuit 405 (which will be referred to simply as a density converting circuit in the subsequent part) through a delaying circuit 411a. Then, out of the image data on which a color editing operation has been done, the luminance signal V in eight bits are fed as it is into the selector 416, but the hue signal H in seven bits and the chroma signal C in five bits are put into an LUT 415b, in which these signals are respectively converted into a first color difference signal a* in eight bits and a second color difference signal b* in eight bits. However, the LUT 415b does not convert the hue signal H and the chroma signal C directly into the first color difference signal a* in eight bits and the second color difference signal b* in eight bits, respectively, but the LUT 415b outputs the signal a* and the signal b* in six bits, respectively, and these signals are formed into data in eight bits with the addition of "00" to fill the two least significant bits. With this operation, the LUT 415a and the LUT 415b can be made equal in their capacity and identical in their construction.

The selector 416 is furnished with the THSEL signal from the color converting circuit 413, and it is determined with the THSEL signal which of the output from the LUT 514b or the output from the delaying circuit 417 should be selected for its output. A description will be made of this THSEL signal later on. Then, the output from the selector 416 is transmitted to the matrix circuit 16b shown in FIG. 3.

Figure 5:
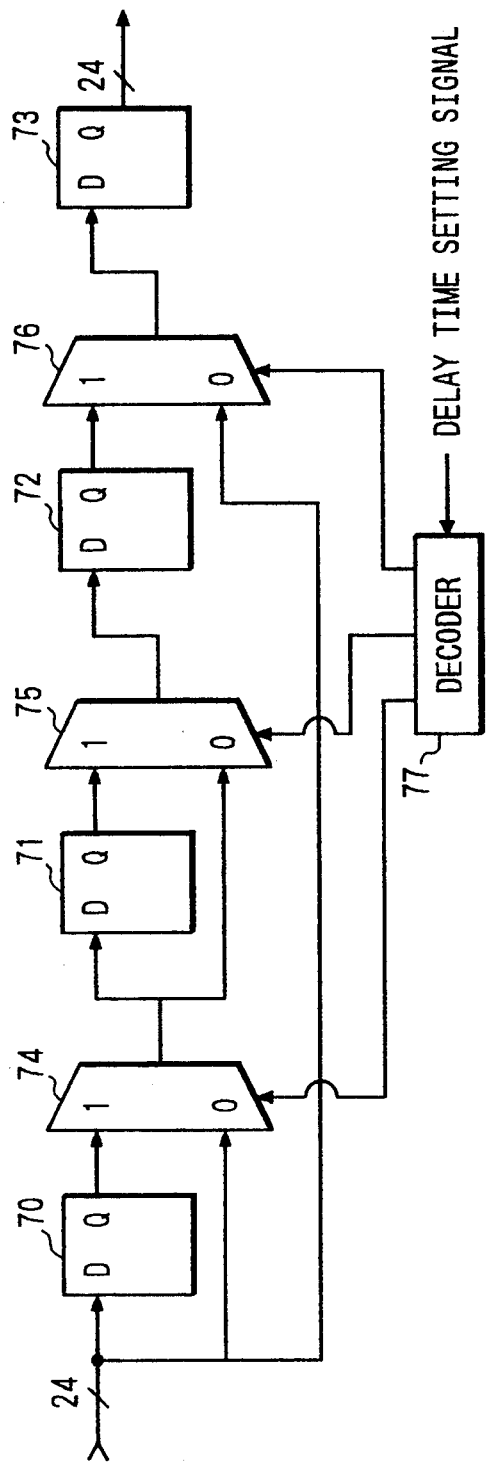
FIG. 5 is a diagram showing an example of the construction of a delaying circuit.

Here, the delaying circuit 417 is constructed, for example, with a variable delaying circuit as shown in FIG. 5. In FIG. 5, reference numerals 70 through 73 designate D-type F/Fs used as the delaying elements, reference numerals 74 through 76 designate the selectors, and reference numeral 77 designates a decoder. Upon reception of "1" from the decoder 77, the individual selectors 74 through 76 select and output the signals fed into them from the F/Fs, but, upon reception of "0", these selectors select and output the other signals fed into them. Therefore, it is possible to obtain a desired delay time by specifying the signals to be selected by the individual selectors by the effect of the delay time setting signal fed into the decoder 77. This point is important. The reason is that the kinds of the color editing operations to be performed in the color converting circuit 413 are subject to changes in the future, and, in such a case, it will be necessary to change also the delaying time, which is needed in the delaying circuit 417. Furthermore, it is possible that the number of bits to be converted or the converting speed should be changed also with regard to the LUT 415a and the LUT 415b, and it will be necessary also in such a case to change the delaying time for the delaying circuit 417. In such cases as these, it will be possible to take an appropriate measure with a delaying circuit constructed in such a way as to permit a change in the delaying time by a delay time setting signal, as shown in FIG. 5.

Now, in case color editing is to be performed, it will be necessary for the user to set up an area in which the color editing operation is to be performed. The available methods of setting up such an area include a method consisting of placing an original sheet on the editing pad 61 and indicating a desired position of such an area, a method consisting of drawing a desired closed area on the original sheet with a marking pen in a desired color, and a method consisting of utilizing a closed area drawn in the image on the original sheet. Further, the available methods of instructing whether a desired editing process should be executed on the inside region of a specified closed area or on the outside region of such a specified closed area include a method consisting of indicating, by means of the editing pad 61, an arbitrarily selected single point in an area on which an editing process is to be performed and a method of drawing a marker dot at one arbitrarily selected point within an area on which an editing process is to be performed.

Then, the coordinate data specified on the editing pad 61 are transmitted from a CPU not shown in the drawing to a plane memory 403 via a graphic controller 401 and a DRAM controller 402, and the pattern for the area thus set up is written to the plane memory 403. Moreover, the coordinates for the point specified on the editing pad 61 are passed through the DRAM controller 402, the density converting circuit 405, and further a coordinate value generating circuit 407 and are written to a RAM 406. Then, the data on the coordinates for the point as written to the RAM 406 are read out by the CPU after the completion of a prescanning operation and notified to the graphic controller 401. With this, the graphic controller 401 performs a processing operation for finding the closed area which is taken as the object of the editing process, using the coordinate data mentioned above as the starting point for a search for the closed area. The processing operation is to be performed in the same manner as in the conventional process, and a description of the operation is therefore omitted here.

In this regard, the plane memory 403 is comprised of four plane memories having the pixel density of 100 spi, and, as one bit is allocated to each plane, each area will be expressed with a code consisting of four bits, so that 16 areas can be distinguished. Moreover, the pixel density of the editing pad 61 is set at 100 spi. Additionally, the plane memory 403 is provided with a work plane and a mask plane, in the same way as in the conventional construction, for use as a work area for the conduct of a search for a closed area.

The pattern of a closed area drawn in a marker color is read at the time of a prescanning operation. The image data in the marker color which are read are converted into binary values by a window comparator 501 provided in the inside of the color converting circuit 413, which will be described later, and are thereafter transmitted to the density converting circuit 405, in which the data are subjected to a conversion of their density from 400 spi to 100 spi. On this occasion, the density converting circuit 405 performs a pixel density converting operation, in which the density converting circuit 405 indicates "1," using FIFOs 410a, 410b, and 410c, in case the pixels as markers out of the 16 pixels are at least equal to a prescribed number in a window measuring 4×4. The area pattern on which a density conversion has been made is written to the plane memory 403 via the DRAM controller 402, operating under control by the graphic controller 401. Then, in the same manner as in the conventional process, codes in four bits each are assigned in regular sequence to the patterns of the individual areas thus written to the plane memory 403. This code in four bits is an ACMD for distinguishing the editing process set for each area.

The above-mentioned pixel density conversion is performed also on the marker dots indicated with a marking pen, and the resulting data are put into the coordinate value generating circuit 407, which determines the coordinate values in the image on the original sheet and writes the values to the RAM 406. On this occasion, the image data in the marker color are subjected to simple thinning in the ratio of one line for every two lines and then to simple thinning in the ratio of one pixel for every two pixels, and thereby converted into a pixel density of 50 spi. Moreover, this marker dot will be written also to the plane memory 403, and yet nothing is utilized of the marker dot thus written to the plane memory 403.

In case a menu has been selected for performing a desired editing process on a closed area drawn on an original sheet in black and white, the data on an image in black and white are converted into binary values by the window comparator 501, which will be described later, and are then subjected to the pixel density conversion mentioned above, and the resulting data are written into the plane memory 403 by the DRAM controller 402.

Now, the coordinate values for the areas and points which have been specified on the editing pad 61 are written as they are to the plane memory 403, but, in contrast to this, the subsidiary scanning speed of the IIT 100 at the time of a copy scanning operation is set at a speed in accordance with the set reducing or magnifying ratio. Therefore, the coordinate value for the ACMD as read out of the plane memory 403 at the point in time when the data on the image are put into the color converting circuit 413 is in agreement with the data on the image in respect of the main scanning direction, but is different from the position of the data on the image in respect of the subsidiary scanning direction. Therefore, the value for the subsidiary scanning direction out of the coordinate values set by operations on the editing pad 61 is multiplied with the set reducing ratio or magnifying ratio, and the position of the ACMD read out of the plane memory 403 is thereby brought into agreement with the position of the image data. This processing operation is performed by the graphic controller 401 by taking a reducing or magnifying ratio from the CPU into itself. Now that the coordinate value written to the plane memory 403 is thereby set at such a value as corrected in respect of the subsidiary scanning direction in accordance with the reducing or magnifying ratio, it is made possible to perform an editing operation in the set position, regardless of the value of the reducing or magnifying ratio.

Now, the coordinate value generating circuit 407 will be described in detail below. This coordinate value generating circuit 407 corresponds to the marker dot detecting means 1 according to the present invention and is formed, for example, in the construction illustrated in FIG. 6.

A template mask block 601 includes template masks $601_1$, $601_2$, and $601_3$ corresponding to the individual marker colors, so that it may detect marker dots in three kinds of marker colors. However, the template masks $601_2$ and $601_3$ are omitted from FIG. 6.

The template mask 601₁ includes a rectangular template 602 composed of nine pixels by nine pixels and a FIFO 603, which performs a simple thinning operation in the ratio of one line for every two lines, as well as a simple thinning operation in the ratio of one pixel for every two pixels, on the marker color image data as converted into binary values and forms the data into blocks each composed of nine pixels by nine pixels. The reason why the pixel density of the image data is converted from 400 spi to 100 spi and further to 50 spi is that a memory capacity of 10 bits will be sufficient for the coordinate data both in the main scanning direction and in the subsidiary scanning direction, as described later, so that the capacity of the RAM 406 can be reduced proportionately, such a reduction of the required memory capacity serving the purpose of restraining an increase in the cost, in case the coordinates for the marker dot are to be detected at the pixel density of 50 spi, whereas the number of bits of the coordinate data will have to be increased, so that it will be required to construct the RAM 406 with a memory having a large capacity, in case the coordinates for the marker dot are detected at the pixel density of 100 spi. Further, as the coordinates for the marker dot are to be utilized as the starting point for a search which is conducted in the plane memory 403 for locating a closed area, no impediment will be caused even if there is some deviation from the coordinates in the image on the original sheet.

The block 604, which measures three pixels by three pixels and is positioned in the center of the template 602, is to determine the minimum size of the marker dot to be detected, and the prohibiting pixel 605 on the outer circumference indicated by slant lines is to determine the maximum size of the marker dot. Moreover, the template mask 601₁ will generate a HIT signal, with the particular dot pattern treated as a marker dot, only in the case in which the size of the dot pattern completely covers the internal picture element block 604 and yet does not contain even one prohibiting pixel 605. Therefore, the size of the marker dot in FIG. 6 will be in the range of 1.5 mm square to 3.5 mm square.

Since the apparatus embodying the method according to the present invention detects the marker dot by pattern matching, it is capable of performing an accurate detection of a marker dot even though it is simple in construction. In this regard, the size of the dot pattern detected as the marker dot can be set arbitrarily by varying the size of the internal block 604 and by the manner how the prohibiting pixel 605 is arranged on the template.

The marker dot detecting process described above is performed at the same time in the template masks 601₁, 601₂, and 601₃.

A timing circuit 606 accepts the input of a page synchronizing signal ps, which indicates the beginning of a reading operation of the image on the original sheet, a line synchronizing signal ls, and a video clock vclk and divides their frequencies as appropriate, and feeds a prescribed timing signal to the template mask block 601, the FIFO 603 in the inside of the template mask block, an FS counter 607, which finds the coordinates for the main scanning direction, an SS counter 608, which finds the coordinates for the subsidiary scanning direction, and a pixel position determining block 609.

The pixel position determining block 609 takes into itself the count values recorded in the FS counter 607 and the SS counter 608, respectively, in case the template mask block 601 has generated a HIT signal, and then determines the count values mentioned above as the coordinate values for the marker dot and outputs both the coordinate data for the FS direction and those for the SS direction in ten bits, and, together with these processing operations, the pixel position determining block 609 performs the processing operations described below.

Figure 7C:
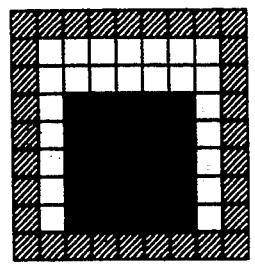
FIGS. 7A through 7C are diagrams for explaining the successive output of HIT signals.
Figure 7B:
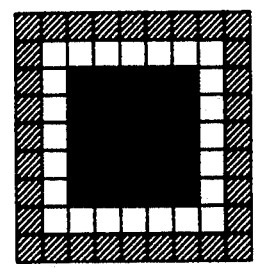
Figure 7A:
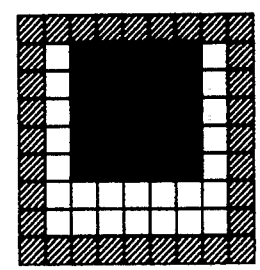

One of these is a processing operation which determines only the first HIT signal to be effective in case HIT signals have been generated in succession from the individual template masks. In specific terms, the state shown in FIG. 7A will be attained for a marker color dot pattern in the size composed of five pixels by five pixels in case the template 602 shown in FIG. 6 is used, and a HIT signal will be generated at this point of time. However, the state shown in FIG. 7B will be attained upon the occurrence of the next clock, and further the state shown in FIG. 7C will be attained upon the occurrence of the subsequent clock. In this case, HIT signals will be thus generated three times in succession. Although it is of course possible to store the coordinate data in the RAM 406, determining all these HIT signals to be effective, the processing operation which consists in determining only the first of the HIT signals to be effective is performed in case HIT signals have been generated in succession because dots in a size approximately 2.5 mm square are used frequently and because it would accordingly be required of the RAM 406 to have a large capacity if all the HIT signals were determined to be effective.

Also, as the template mask block 601 performs processing operations for detecting a marker dot for the three marker colors at the same time, it is conceivable that two or more HIT signals are generated at the same time. This means that a plural number of marker dots are drawn in one and the same position on the original sheet, but it is not only unnatural that a plural number of marker dots should be drawn in the same position, but also it is to be judged that the occurrence of marker dots in two or more colors would result in an unnatural state in any case because two or more marker colors would make a color other than the marker colors if they were mixed. Therefore, a processing operation for determining all the HIT signals ineffective is performed in case two or more HIT signals have been issued at the same time.

Moreover, in case any effective HIT signal has been generated from the template mask block 601, the pixel position determining block 609 performs a processing operation for putting out the information which indicates which template mask the particular HIT signal has been generated from, i.e., what marker color the particular marker dot has been detected in.

Figure 8:
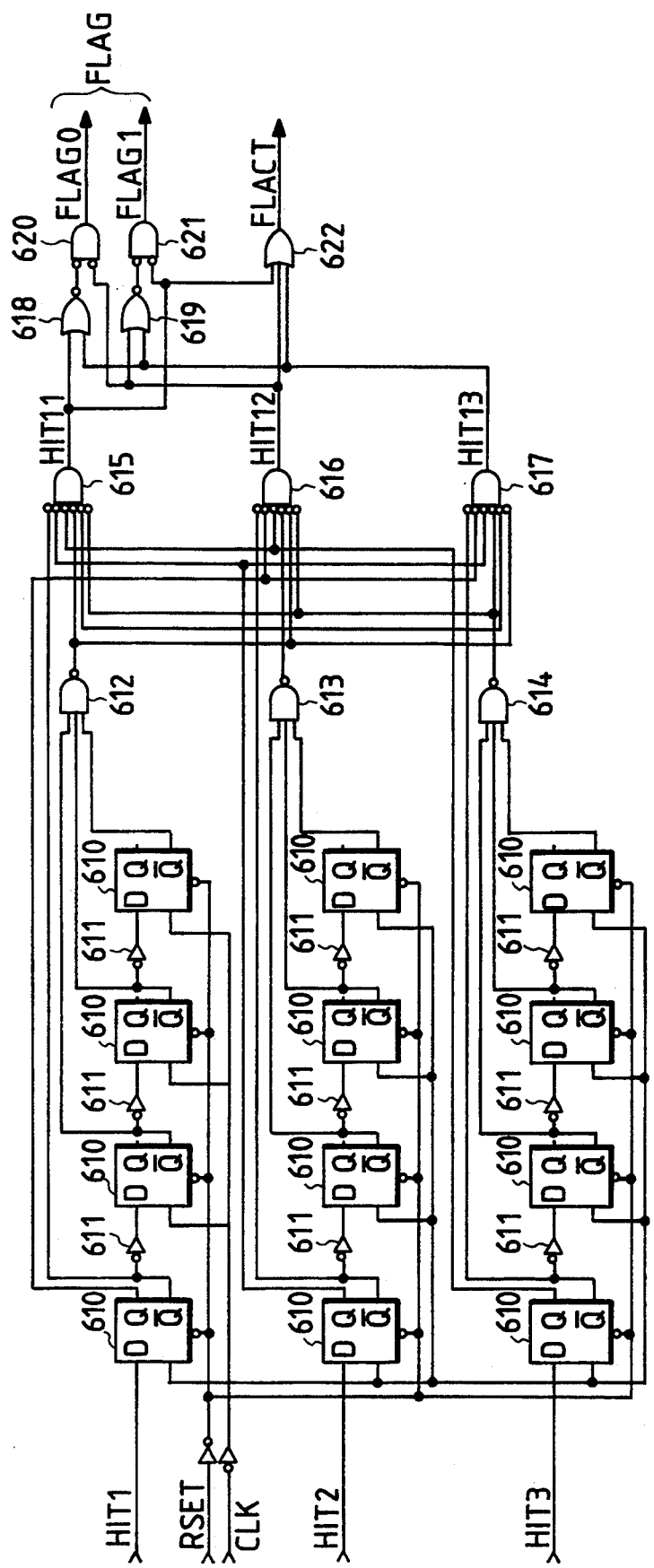
FIG. 8 is a diagram showing an example of the construction of a pixel position determining block.

The three kinds of processing operations described above can be performed, for example, with a logic circuit shown in FIG. 8. Moreover, in FIG. 8, reference numeral 610 designates a D-type flip-flop (DF/F), reference numeral 611 designates a NOT circuit, reference numerals 612 to 614 designate NAND circuits, reference numerals 615 to 617, 620, and 621 designate AND circuits, reference numerals 618 and 619 designate NOR circuits, and reference numeral 622 designates an OR circuit.

Figures 9, 10, 11:
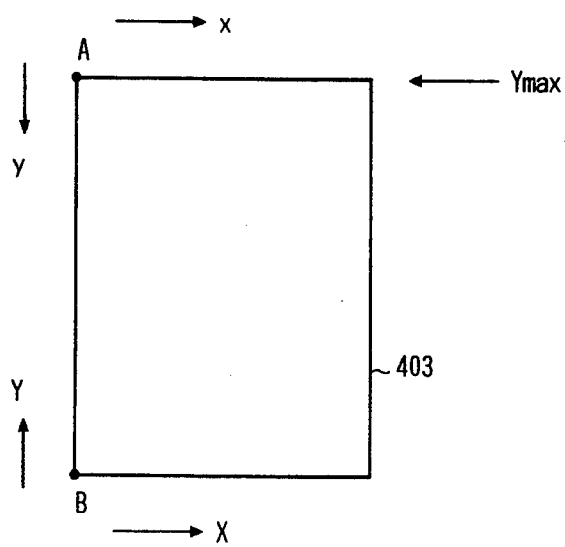
FIG. 9 is a table showing the relationship between the HIT signal and the FLAG signal in the construction shown in FIG. 8.
FIG. 10 is a diagram for explaining a process to be performed in case where the coordinates found by the pixel position determining block and the coordinates on the plane memory are different.
FIG. 11 is a diagram showing an example of the construction of a table with which the density converting circuit is provided.

The logic circuit shown in FIG. 8 is in such a circuit construction as will determine only the first HIT signal to be effective, out of HIT signals generated in succession, by the action of a shift register comprised of four DF/Fs 610 and three NOT circuits 611 for one HIT signal through utilization of the fact that HIT signals are not output four times in succession in case the template 602 shown in FIG. 6 is used, and this logic circuit performs a prohibiting operation, in case two or more HIT signals have been generated, and a processing operation for generating a marker color flag FLAG, which indicates what marker color a given marker dot has been detected in, by performing prescribed logical arithmetic operations further with the above-mentioned circuits provided in parallel for the three kinds of HIT signals, namely, HIT1, HIT2, and HIT 3. Then, when the logic circuit has detected a truly effective HIT signal, the circuit outputs a FLACT signal for latching by taking the count value recorded with the FS counter 607 and that recorded with the SS counter 608 and a flag FLAG indicating what marker color the particular marker dot has been formed in. The relationship between the value of the HIT signal output from the template mask block 601 and the value of the marker color flag is as shown in FIG. 9.

Moreover, the circuit shown in FIG. 8 prohibits multiple counts of HIT signals generated in succession only in the main scanning direction. However, the matters explained with regard to FIGS. 7A through 7C hereinabove apply in the same way to the subsidiary scanning direction, and thus HIT signals will be generated three times in succession in the subsidiary scanning direction in the case of a dot pattern composed of five pixels by five pixels. In case HIT signals have been generated in succession in the subsidiary scanning direction, it is of course possible to perform a processing operation which determines only the first HIT signal to be effective in the same manner as what is described above, but such an operation would require several line memories, which would entail an increase in the costs. For this reason, the copying machine described herein as an example of the present invention is designed in such a manner that the copying machine will permit HIT signals to be generated in succession in the subsidiary scanning direction.

Now, there area variations in the thickness of the pen point of the marking pen, and it is therefore difficult to foresee what type of marking pen the user will use. For this reason, it is not desirable to fix at 50 spi the coordinate density and pixel density of the marker color image as converted into binary values which are subjected to pattern matching in the template 602. On this ground, two types of density, namely, 50 spi and 25 spi, are made available in this copying machine for the conversion of pixel density by the FIFO 603, and the conversion of pixel density in this copying machine is designed in such a way that these two types of density can be changed over from one to the other in accordance with the thickness of the pen point on the marking pen which the user actually uses. In other words, the FIFO 603 executes simple thinning in the ratio of one line for every two lines and also executes simple thinning in the ratio of one pixel for every two pixels as described above in case the CPU has specified 50 spi, but, in case the CPU has specified 25 spi, the FIFO 603 extracts the image data in the marker color in the ratio of one line for every four lines and extracts the data in the ratio of one pixel for every four pixels. At the time of this operation, the frequency of the timing signal supplied to the FIFO 603 and to the template 602 is divided into one half of the timing signal generated for the density of 50 spi, but the same timing signal as that for 50 spi is supplied to the FS counter 607 and to the SS counter 608. As the result of this, the same coordinate value will be counted for the same marker dot, whether the pixel density is 50 spi or 25 spi. This is an important matter. That is to say, the coordinates of a marker dot should be in the same value in a case in which the density of the pixel is 50 spi and also in a case in which the density of the pixel is 25 spi, and yet, if the timing signal supplied to the FS counter 607 and the SS counter 608 is varied, a different coordinate value will be obtained. However, the process according to the present invention can obtain the same coordinate value for the same marker dot by keeping in a constant value the timing signal which is supplied to the FS counter 607 and the SS counter 608 without any dependence on the pixel density as mentioned above.

The coordinate data for the marker dot and the marker color flag output from the pixel position determining block 609 in the manner described above are written to the RAM 406. After that, the CPU takes the coordinate value for the marker dot from the RAM 406 into itself and gives the coordinate value to the graphic controller 401, when the prescanning operation has been completed, and instructs the graphic controller 401 to conduct a search for the closed area which is specified as the object of the editing process. At this moment, it may happen in some cases that the point of origin of the coordinates on the original sheet is different from the point of origin for the coordinates as stored in the plane memory 403, as illustrated in FIG. 10. In FIG. 10, the reference mark A designates the point of the coordinates on the original sheet, that is, the original point for the values counted by the FS counter 607 and SS counter 608, the reference mark B designates the point of origin for the coordinates in the plane memory 403, the reference marks x and y respectively designate the coordinate values in the main scanning direction and in the subsidiary scanning direction, which take point A as their respective original points, and the reference marks X and Y respectively designate the coordinate values in the main scanning direction and in the subsidiary scanning direction, which take point B as their respective original points.

In such a case like this, the CPU is to be caused to perform arithmetic operations expressed in the equations (1) and (2) given below, so that the coordinates (x,y) are thereby converted into the coordinates (X,Y) and then to notify the coordinate values of the marker dot to the graphic controller 401.

$$Y = Y_{max} - 2 \cdot y \qquad (1)$$

$$X = 2 \cdot x \qquad (2)$$

In the equations given above, moreover, the coefficient "2" for x and y is determined on the ground that the value of the coefficient is the one to be set in case the coordinate data output from the pixel position determining s block 609 has the pixel density of 50 spi whereas the pixel density on the plane memory 403 is 100 spi.

Then, when the graphic controller 401 is given the coordinate data for the marker dot from the CPU, the graphic controller 401 performs an operation in search for a closed area, using the coordinate data thus given to it as the starting point for a search for the closed area, and generates an area command ACMD in the plane memory 403.

The ACMD generated in four bits in the plane memory 403 is read out at the time of a copy scanning operation in synchronization with the reading of the image data and is fed into the density converting circuit 405 via the DRAM controller 402. The density converting circuit 405 reads out the information set on the editing process in each ACMD from the internal table, as described later, on the basis of the ACMD thus input and notifies the necessary information to the color converting circuit 413 and to the various circuits shown in FIG. 3. When this ACMD is read out of the plane memory 403 and used for such processing operations as an editing process in the color converting circuit 413 and a changeover of the parameters or the like in the image data processing system, it is necessary to convert the density of the data from 100 spi to 400 spi, and this processing operation is performed in the density converting circuit 405. For this purpose, the density converting circuit 405 performs the formation of blocks 3×3, using the FIFOs 409a and 409b, and effects a conversion of the density from 100 spi to 400 spi and performs an interpolation of the data so that the closed loop curve and the boundaries of the editing areas or the like may be smoothed thereby. Delaying circuits 411a and 411b, FIFO 412, and so forth are operated to make timing adjustments between the information notified to the various parts and the image data.

Now, when the user performs a copying operation, it is necessary for the user to do various setting jobs, such as the setting of a color mode, i.e. to specify whether the copy is to be taken in full colors or in a mono-color, the setting of the color for the particular mono-color to be used for the output of the copy in case the copying job is to be done in a mono-color, the setting of the image data to be copied, namely, whether the image data read by the IIT 100 are to be copied, or the image data stored in the memory system 200 are to be copied, or those image data are to be synthesized, the setting of the type of synthesis, i.e. what synthesis is to be made of those image data, the setting of the type of the original sheet, i.e. whether the original sheet to be copied is an original sheet with characters thereon, or an original sheet with a photograph on it, the setting of setting to specify whether the copying job is to be performed in an ordinary way or for the production of a copy with the negative-positive reversal. The setting of these items are entered by operations on the U/I 36, and the information set by the user for the copying job is written by the CPU to the table in the density converting circuit 405. FIG. 11 is a chart which illustrate an example of the construction of the table, and the individual data, LOGIC, TSEL, MUL, CCSEL, NEG, TYPE, FUL, MON, and ESS, are written in respective setting areas. Accordingly, when the ACMDs which are read out of the plane memory 403 in synchronization with the image data are fed in regular sequence into the density converting circuit 405, this density converting circuit 405 reads out the information set in the area corresponding to the particular ACMD, using the ACMD fed into it as the input address for the specified table, and notifies the information thus read to the color converting circuit 413 and the other circuits.

Figure 12:
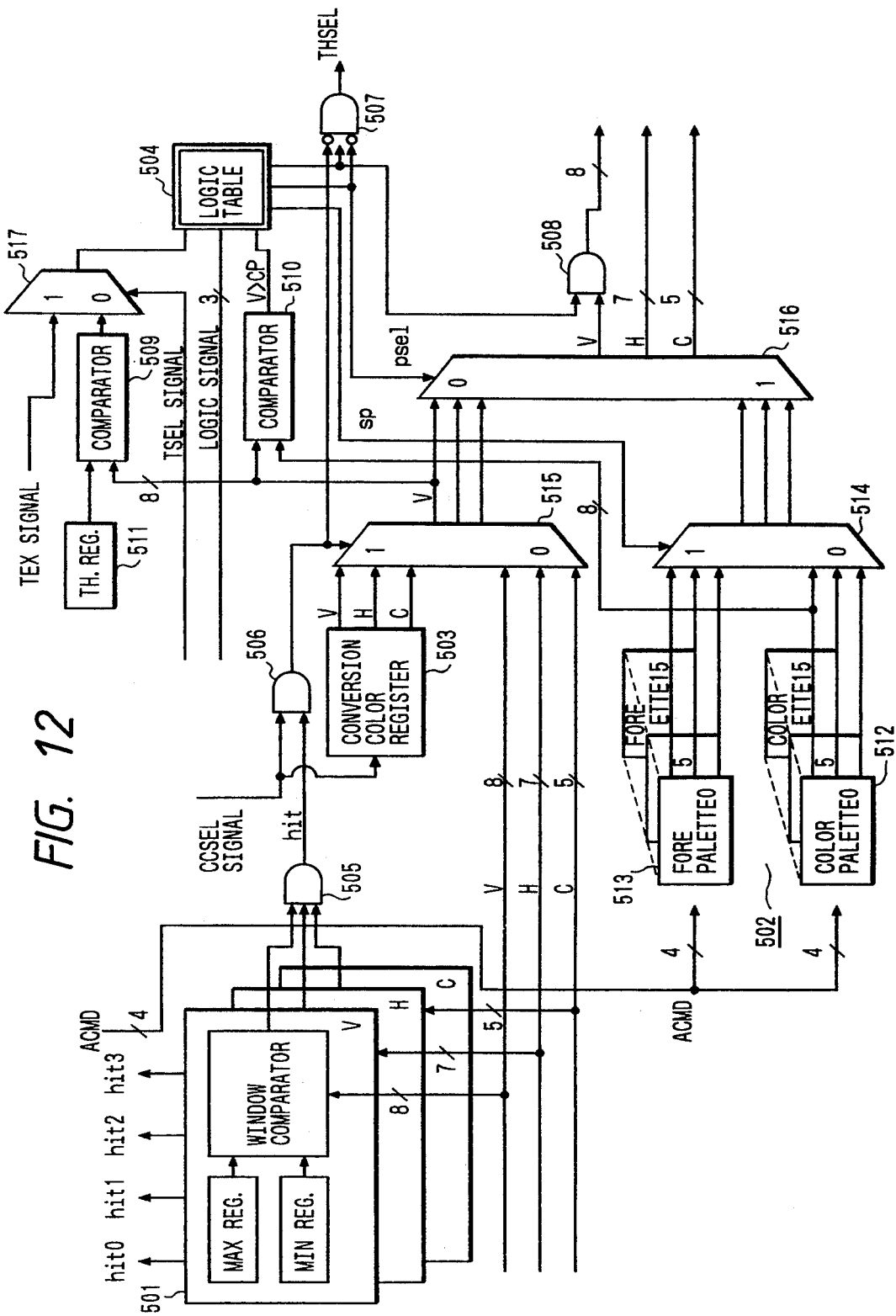
FIG. 12 is a diagram showing an example of the construction of a color converting circuit.

Next, a description will be made of the construction of the color converting circuit 413 with reference to FIG. 12, which presents a diagram illustrating an example of the construction of the parts relevant to the present invention in the construction of the color converting circuit 413. In FIG. 12, reference numeral 501 designates a window comparator, reference numeral 502 designates a pallet, reference numeral 503 designates a conversion color register, reference numeral 504 designates a logic table, reference numerals 505 through 508 designate AND gates, reference numerals 509 and 510 designate comparators, reference numeral 511 designates a threshold value setting register, reference numeral 512 designates a color palette, reference numeral 513 designates a fore-palette, and reference numerals 514 through 516 designate selectors. In this regard, an AND gate circuit, which is identical with the AND gate circuit 508, is provided, though not shown in FIG. 12, for processing H and C, which are outputs from the selector 516, and control is performed on the AND gate with the signal zt generated from the logic table 504.

The window comparator 501 is a table to which the range of colors to be extracted out of the image data, such as the converted colors or the like in color conversion, the respective ranges of the three kinds of marker colors set in advance, and the range of black color for the extraction of only the black color from images in black and white are written, and the maximum value and the minimum value for determining the respective ranges of extraction for V, H, and C for each color to be extracted are written to this table. The range of the color of the converted color in the color conversion process is, of course, the range which the user has set by operations on the U/I 36. For example, in case red color is to be extracted in respect of a given area, the range of luminance, the range of hue, and the range of chroma in respect of the red color to be extracted are written to the address, which corresponds to the particular area, in the window comparator. Then, the gate circuit 505 outputs a hit signal only in case all of the V, the H, and the C are within the ranges set in the window comparator 501 as determined by the window comparator 501 when it reads out the range of extraction set in the particular area, using the ACMD as the input address, and compares the range of extraction with the image data put into it.

Also, the window comparator 501 outputs hit1, hit2, and hit3 in accordance with the detected marker colors when it has detected any marker color and outputs hit0 when it has detected black in the image on the original sheet. It is evident that these hit1, hit2, and hit3 are nothing other than marker color image data as converted into binary values, and hit0 is nothing other than black and white image data as converted into a binary value. Moreover, hit1, hit2, and hit3 are fed into the density converting circuit 405 either directly or via the FIFOs 410a, 410b, and 410c, in which they are processed for theft pixel density conversion, being thereafter fed to the coordinate value generating circuit 407. Also, hit0 is similarly processed for its pixel density conversion and is then written to the plane memory 403.

The palette 502, which is to be used in an editing process accompanied with coloration, includes two palettes, namely, the color palette 512 and the fore-palette 513. Both the color palette 512 and the fore-palette 513 are composed of tables which define preset sixteen colors in terms of V, H, and C, and the ACMD data will determine of what color the data are to be output. It is determined on the basis of the contents of a given color editing process whether the color data are to be read out of the color palette 512 or to be read out of the fore-palette 513. In this regard, both the color palette 512 and the fore-palette 513 output eight bits for the luminance V, seven bits for the hue H, and five bits for the chroma C. By this, it is made possible to construct the palette 502 with a memory in a small capacity.

The conversion color register 503 is used in an editorial process accompanied with color conversion, and the values of V, H, and C are written in respect of four preset colors, respectively, to this register 503.

The logic table 504 receives a flag FLAG and a LOGIC signal from the selector 517, as well as the output from the comparator 510, and outputs a signal sp, which controls the changeover of the selector 514, and a signal psel and a signal zt, which control the changeover of the selector 516. The relationship between the input and output of the logic table 504 is illustrated in FIG. 13. In this regard, the comparator 510 compares the output V from the selector 515 and the output V from the color palette 512 and outputs "1" in case the output V from the selector 515 is the larger of the two. Also, the selector 514 selects and outputs the signal which shows "1" in FIG. 13, namely, the data from the fore-palette 513 in this case, when the signal sp is "1", but selects and outputs the signal which shows "0" in the Figure, namely, the data from the color palette 512 in this case, when the signal sp is "0". The same applies to the selectors 515 and 516.

Next, a description will be made of the flow of data shown in FIG. 11 and the operations of the construction shown in FIG. 12.

The LOGIC data are the data which specify the type of the editorial process (annotation) relating to coloration shown in FIG. 14, and the TSEL data are the data which specifies the annotation and specifies the synthesis of characters, as shown in FIG. 15.

In the case of an ordinary copy in respect of which annotation is not specified, all the LOGIC data are made "0" and will consequently be psel =0, zt=1, and sp=0, as shown in FIG. 13, and additionally the output from the gate circuit 506 is made "0" at this time. Therefore, V, H, and C pass through the color converting circuit 413, but, as the THSEL signal, which is output from the gate circuit 507, becomes "1," the selector 416 (FIG. 4) selects and outputs the output from the delaying circuit 417. That is to say, the color converting circuit 413 processes the image data, L*, a*, and b*, which are in eight bits each, in the form of image data in a total of twenty bits for V, H, and C, and the fidelity of the reproduced image as compared with the image on the original sheet will be inferior to the image data, L*, a*, and b*, but, as the result of the performance of the operations mentioned above, image data, L*, *a, and *b, in eight bits each, are selected for those pixels on which the color editing process is not performed. Hence, it is thereby made possible to obtain an image attaining fidelity to the image on the original sheet.

In case the coloration of characters has been selected as annotation, TSEL=0 holds valid. Therefore, the selector 517 selects the output from the comparator 509, which means that LOGIC=001, and, since sp=0 as shown in FIG. 13, the selector 514 selects the output from the color palette 512. Then, at this moment, the output from the gate circuit 506 is "0" and the input image data, V, H, and C, will pass through the selector 515. However, the comparator 509 compares V with the threshold value TH, and flag=1 will be realized in case the value of V is equal to or in excess of the threshold value, but flag=0 will be realized in case the value of V is less than the threshold value. Then, in the case of flag=1, psel=zt=1 will hold valid. Therefore, the data in the colors, V, H, and C, as prescribed, which are read out of the color palette 512, will be output. However, in the case of flag=0, psel=zt=0 will hold valid. Therefore, the output from the selector 516 is prohibited in the gate circuit 508, so that all the values of V, H, and C will be "0". Moreover, THSEL=0 holds valid at this time, and the selector 416 accordingly selects the output from the color converting circuit 413. By this, the character block (foreground; f.g.) in a desired area of the image on the original sheet will be rendered in the color set on the color palette 512, while the background area (background; b.g.) excluding the character block can be rendered colorless. That is to say, only the character block can be colored in a desired color.

In case a color relief character has been selected as annotation, psel=zt=1 will hold valid. Therefore, the selector 516 always selects the output from the color palette 502. Also, as TSEL=0 holds valid, the selector 517 selects the output from the comparator 509. At this time, then, the output from the gate circuit 506 is "0" and the input image data in V, H, and C will pass through the selector 515, but the comparator 509 compares V with the threshold value TH, and flag=1 will be realized in case the value of V is equal to or in excess of the threshold value, but flag=0 will be realized in case the value of v is less than the threshold value. Moreover, in case flag=1 holds valid, then sp=1 is valid, and the selector 514 will therefore selects the data in the colors V, H, and C as prescribed, which are read out of the fore-palette 513. However, in the case where flag=0, sp=0 is attained, and the selector 514 accordingly selects the data in the colors V, H, and C as prescribed, which are read out of the color palette 512. In this regard, THSEL=0 holds valid at this time, and the selector 416 therefore selects the output from the color converting circuit 413. By this, it is made possible to paint out the character block and the background area uniformly in desired colors, respectively.

In case "paint" has been selected as annotation, psel=zt=1 and sp=0 hold valid. Hence, the data in the V, H, and C colors as prescribed, which are read out of the color palette, are always output. Moreover, as THSEL=0 is attained at this time, the selector 416 selects the output from the color converting circuit 413, and it is thereby made possible uniformly to paint out a set area with a desired color.

In case coloration has been selected as annotation, zt=1 and sp=0 hold valid, and the selector 514 selects the output from the color palette 512. Also, as TSEL=0 is attained, the selector 517 selects the output from the comparator 509. At this time, moreover, the output from the gate circuit 506 is "0". Hence, the input image data in V, H, and C pass through the selector 515, and the comparator 509 compares V with the threshold value TH, and flag=1 is attained in case the value of V is equal to or in excess of the threshold value while flag=0 is attained in case the value of V is less than the threshold value. Then, as psel=0 holds valid in the case of flag=1, the selector 516 selects the image data from the selector 515. Yet, as psel=1 holds valid in the case of flag=0, the selector 516 selects the data in the V, H, and C colors as prescribed, which are read out of the color palette 512. In this regard, THSEL=0 is attained at this time, and the selector 416 therefore selects the output from the color converting circuit 413. By this, it is made possible to paint out only the background area, which excludes the character block, with a desired color.

In case character synthesis has been selected as annotation, zt=1 and sp=0 hold valid. The selector 514 therefore selects the output from the color palette 512.

Also, as TSEL=1 (FIG. 15) is attained, the selector 517 selects the TEX signal. The selector 17 (FIG. 3) compares the value of the luminance in the input image data with the predetermined threshold value and outputs TEX=1 in case the value of the luminance V is equal to or in excess of the threshold value, but outputs TEX=0 in any other case. Then, the value of the flag in the selector 517 will be "1" when TEX=1 is attained. Then, when flag=1 holds valid, psel=1 is attained, and the selector therefore selects the data in the colors V, H, and C as prescribed, which are read out of the color palette 512. However, when flag=0 holds valid, psel=0 is attained, and the selector 516 therefore selects the image data from the selector 515. At this time, moreover, THSEL=0 is attained, and the selector 416 therefore selects the output from the color converting circuit 413. By this, it is made possible to pain out only the character block in a desired color.

The MUL data in FIG. 11 are a signal for specifying a mono-color editing process to a set area. As shown in FIG. 16, "through" and fifteen mono-colors marked from A to O are determined in advance in accordance with the values in four bits, as illustrated in FIG. 16. These MUL data are notified from the density converting circuit 405 to the multiplier 28. It goes without saying that a delay is effected as appropriate at such a time in order to match the timing in processing.

At the time of the ordinary copying operation in which the mono-color editing process is not set up, all the bits of the MUL data are set in "0" and a coefficient for letting the input image data pass through will therefore be set in the multiplier 28, so that the image data will be output as they are. In case any mono-color editing process in a predetermined color has been selected, the MUL data in a value corresponding to the particular color will be notified to the multiplier 28. By the effect of this operation, the multiplier 28 multiplies the input image data L* for each process color with such a coefficient as is determined by the MUL data and outputs the resulting value. For example, it is assumed here that the multiplier coefficient A designates a mono-color in green, the coefficients thereof being 100% for both Y and C and being 0% for both M and K. Then, in case the MUL data specify A, the multiplier 28 lets the input image data pass through it at the time of the processing of Y and C, but renders the image data as "0" at the time of the processing of M and K.

Next, a description is made in respect of the CCSEL data. These data are those which determines a conversion color in case color conversion is set in an area set on the original sheet, and, as shown in FIG. 17, "through" and seven colors are made available. As described above, four colors, A, B, C, and D, are registered in the conversion color register 503, which is constructed in such a way that it is, of course, possible not only to use any of these registered colors independently, but also to specify any arbitrarily selected color out of a total of seven colors including a color prepared by synthesis of the two colors, A and B, a color prepared by synthesis of the three colors, A, B, and C, and a color prepared by synthesis of the four colors, A, B, C, and D.

In case color conversion is not selected, all the bits of the CCSEL data are "0" and the output from the gate circuit 506 is "0", and, as the LOGIC data are in the through state at this time, psel=0 and zt=1 are attained, and, as the result of this, THSEL=1 holds valid, so that the selector 416 selects the output from the delaying circuit 417.

In case color conversion has been selected, then all the ACMDs are read out of the plane memory. 403 in synchronization with the image data, and further the CCSEL data which correspond to the individual ACMDs are read out from the density converting circuit 405, and both of these are fed into the color converting circuit 413. Moreover, as the LOGIC data are kept in the through state also in this case, psel=0 and zt=1 hold valid.

The ACMD is put into the window comparator 501, and the input image data in V, H, and C and the range of extraction, which is set in the window comparator 501, are compared in the window comparator 501. Then, in case all of the V, H, and C of the input image data are within the range of extraction, the gate circuit 505 generates a hit signal. This hit signal is put into the gate circuit 506, and, in case the hit signal is "1" and the CCSEL data fed from the density converting circuit 405 are not "through" in the above-mentioned gate circuit 506, then the gate circuit 506 outputs "1". By this, the selector 515 selects the output from the conversion color register 503 and outputs the output thus selected, and, at this time, the conversion color register 503 outputs the prescribed data in the colors, V, H, and C, as determined by the CCSEL data. Also, in case the output from the gate circuit 506 is "1", the THSEL signal will be "0", and the data on the conversion color are output from the selector 416, but, in any case other than that, THSEL=1 holds valid, so that the selector 416 selects the output from the delaying circuit 417 and outputs the output thus selected.

Next, a description is made of the NEG data. As shown in FIG. 18, the NEG data are the data which indicate in one bit whether the ordinary copying job is to be performed on the set areas on the area-by-area basis or whether the copying job should be executed by a negative-positive reversal, and these data are notified from the density converting circuit 405 to the ENL 15. As mentioned above, the ENL 15 attains a gray balance by means of the LUT as the one shown in FIG. 19A at the time of the ordinary copying operation (NEG=0), but, in case NEG=1 has been notified, the ENL 15 generates and outputs image data prepared by a negative-positive reversal by means of an LUT for input-output characteristics as shown in FIG. 19B. In this regard, the THSEL signal, which is an output from the gate circuit 507, will be "1" in case a negative-positive reversal has been set, so that the selector 416 selects the output from the delaying circuit 417.

Next, a description is made of the TYPE data, which, as shown in FIG. 20, are the data for setting the types of the original sheet, namely, whether the area set on the original sheet is a standard image, or a character image, or an image like a photograph, or an image containing half-tone images in multiple colors and/or fine characters in color as is the case with a map, and the TYPE data will be set at the standard original sheet unless the user specifically sets another type. These data are notified directly from the density converting circuit 405 to the ENL 15, further notified to the matrix 16a via the delaying circuit 411a, and still further notified to the area decoder 26 via the delaying circuits 411a and 411b. The data which have been decoded by the area decoder 26 are notified to the filter 27, the TRC 29, and so forth, and a processing operation appropriate for the instructed type of the original sheet is executed in each of the circuit. For example, the ENL 15 and the TRC 29 selects the LUT most suitable for the instructed type of the original sheet, and the filter 27 performs filtering operations in accordance with the instructed type of the original sheet, and the matrix 16a sets a conversion coefficient in accordance with the instructed type of the original sheet.

Next, a description will be made of the FUL data and the MON data. These types of data are applied in the combination of these two data, as shown in FIG. 21, to giving instructions on the mode of the original sheet in each set area, and these data are notified to the FIFO 22a, the selector 23, the data resetter 24, the multiplier 28, and so forth via the matrix 16b and the area decoder 26, and the prescribed processing operation is executed. For example, in case a mono-color editing operation has been specified, the matrix 16b permits only L* to pass through it, as described above, and the under color removing circuit 21 similarly outputs L*, the FIFO 22a is prohibited, the selector 23 is caused to select the FIFO 22b, and the multiplier 28 outputs a value obtained by multiplying the value of L* with a coefficient which is in accordance with the instructed mono-color.

Next, a description is given with respect to the ESS data. These data are the data which, as shogun in FIG. 22, specify whether the selector 17 should select the image data read into it from the IIT 100, or should select the image data read out of the memory system 200, or should form a synthesis of these two groups of data, and the ESS data are notified to the selector 17 from the density converting circuit 405 via the delaying circuit 411a. In this regard, the scanner input in FIG. 22 means the selection and output of the image data read with the IIT 100, and the external input means the selection and output of the image data read out of the memory system 200.

Figures 22, 23:
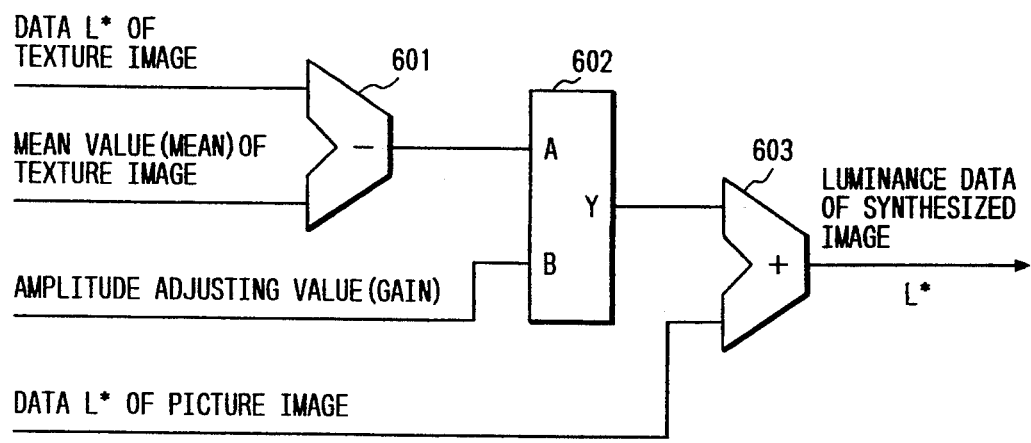
FIG. 22 is a table for explaining the ESS data.
FIG. 23 is a diagram showing an example of the construction of a texture synthesizing circuit.
Figure 24A:
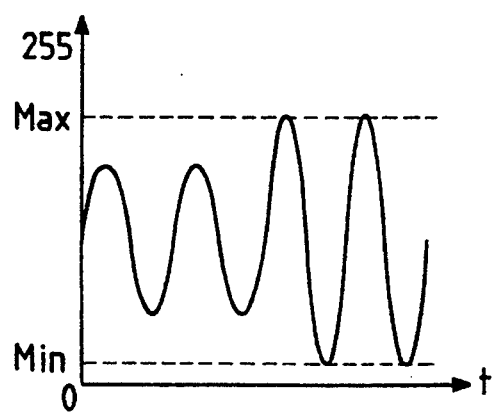
FIGS. 24A through 24C are charts illustrating an example of texture synthesis.
Figure 24B:
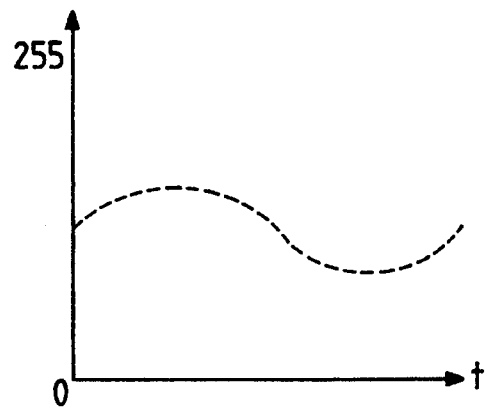
Figure 24C:
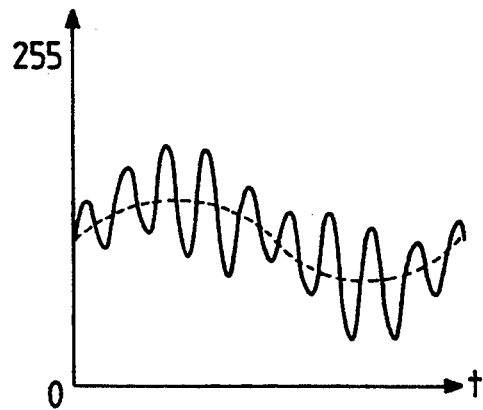

Texture synthesis is as described below. The selector 17 includes a synthesizing circuit, which is illustrated in FIG. 23, and, in case any texture synthesis has been instructed, the synthesizing circuit is set into operation. The texture image which is written to the memory system 200 is read out in synchronization with a scanning operation of the IIT 100, and, at this time, the memory system 200 outputs the luminance data L* of the texture image and also outputs a mean value which it obtains from the maximum value and minimum value of the luminance data L* of the same texture image. The luminance data L* of the texture image and the mean value of the data are fed into a subtracter 601, in which the mean value is subtracted from the luminance data L*. By this operation, the subtracter 601 outputs the data on the alternating current component of the luminance data L* of the texture image. The output from the subtracter 601 is multiplied by an amplitude adjusting value in a multiplier 602, and the output of the multiplier 602 is added up by an adder 603 with the luminance data L* of the picture image read with the IIT 100, and the added value thus obtained is output as the luminance data L* of the image to be formed by the synthesis. In this regard, the amplitude adjusting value is a value which the user has set, and the value is set by the CPU on the multiplier 602. Moreover, the data a* and data b* of the picture image are used as they are for the data a* and data b* of the synthesized image. Therefore, the luminance data of the synthesized image produced by the texture synthesis will be as shown in FIG. 24C, provided that the luminance data of the texture image written to the memory system 200 are as shown in FIG. 24A and further that the luminance data of the picture image read with the IIT 100 are as shown in FIG. 24B.

Figure 25:
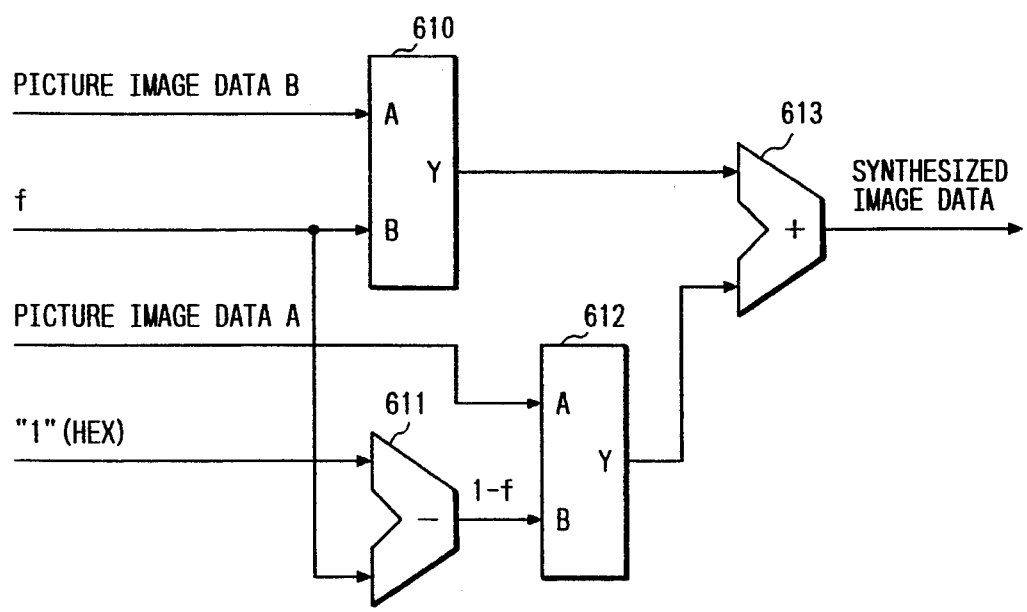
FIG. 25 is a diagram showing an example of the construction of a watermark synthesizing circuit.

Moreover, the watermark synthesis is as described below. The selector 17 includes a synthesizing circuit shown in FIG. 25 with respect to each of L*, a*, and b*, and, in case watermark synthesis has been specified, the synthesizing circuit will be put into operation. Now, the image data read with the IIT 100 are expressed as the image data A and the image data read out of the memory system 200 are expressed as the image data B. Then, the image data B is multiplied with the coefficient f ($0 \leq f \leq 1$) by the multiplier 610, and the image data A is multiplied with the value (1−f), which is an output from the subtracter 611, by the multiplier 612. Then, the output from the adder 610 and the output from the multiplier 612 are added up together in the adder 613, and the synthesized image data are thereby generated. In this regard, the coefficient f is a value which the user has set, and the value is then set on the multiplier 610 and the subtracter 611 by the CPU.

In the foregoing part, a description has been made of one embodiment of the present invention. However, the present invention is not limited to the embodiment described above, and it will be evident to those skilled in the art that the present invention can be modified in a variety of ways.

As it is evident from the description given hereinabove, the present invention can make it possible to specify an area on which an editing process is to be executed, with dots being drawn with a marking pen in an arbitrarily selected position in a closed area drawn on the original sheet or in a closed area drawn by operations on an editing pad or drawn with a marking pen. In addition, the present invention enables the user to specify a plural number of marker colors, thus making it possible for the user clearly to distinguish what editing process is set and which area the process is set for.

Furthermore, the construction which is needed for achieving these advantageous features can be formed at a low cost.

What is claimed is:

1. A marker dot detecting device for a color image recording apparatus, comprising marker dot detecting means for detecting a marker dot by detecting a plane size of binary image date having a preset marker color, said marker dot detecting means including template mask means having a first template mask in a predetermined first size and a second template mask in a predetermined second size larger than the first size, said second template mask including said first template mask, said template mask means outputting a marker dot detecting signal when a detected size of the marker dot is larger than that of said first template mask and smaller than that of said second template mask.

2. The marker dot detecting device as defined in claim 1, wherein said marker dot detecting means further includes marker dot judging means for judging only a first marker dot detecting signal to be effective and the subsequent marker dot detecting signals to be ineffective in case the marker dot detecting signals have been generated in succession by a predetermined number.

3. The marker dot detecting device defined in claim 1, wherein said marker dot detecting means further includes marker dot judging means for judging only a first marker dot detecting signal to be effective and the successive marker dot detecting signals to be ineffective in case the marker dot detecting signals have been generated in succession by a predetermined number, pixel position detecting means for detecting a pixel position in which a central pixel of said template mask means occupies in the image, and pixel position determining means for taking into itself the pixel position data output from said pixel position detecting means to determine said pixel position as a marker dot position in case a marker dot detecting signal judged to be effective by said marker dot judging means has been notified to said pixel position determining means.

4. The marker dot detecting device as defined in claim 3, wherein said template mask means, operating in a case a plural number of marker colors are set up, performs its detection of marker dots concurrently in respect of the plural number of marker colors and wherein said marker dot judging means generates and outputs a marker color flag indicating what marker color the marker dot represented by the marker dot detecting signal output from said template mask means is related to and also determines all the marker dot detecting signals output at a particular time to be ineffective in case any plural number of marker dot detecting signals have been output at the same time in said template mask means.

5. A color image recording apparatus for performing an editing process based on a marker dot detection, comprising:
original input means for supplying an input signal;
means for separating the input signal supplied from said original input means into and for supplying a color signal and a non-color signal; and
means for detecting a marker dot by comparing the color signal supplied from said separating means with a template, said template holding a measure for determining an upper limit of the size of the marker dot to be detected and a measure for determining a lower limit of the size of the marker dot.

6. The color image recording apparatus as defined in claim 5, wherein the measure for determining the lower limit of the size of the marker dot, which is held by said template, has a length more than that of a plurality of pixels in two directions orthogonal to each other.

7. The marker dot detecting device as defined in claim 5, wherein said marker dot detecting means includes means for changing a coordinate density of the marker color image data received.

8. The marker dot detecting device as defined in claim 5, wherein said marker dot detecting means includes a bit map memory in which received image data are written, and bit search means for detecting a marker dot in a predetermined size by conducting a bit search for a pattern of the image data written in said bit map memory.

* * * * *